United States Patent
McCann et al.

(10) Patent No.: US 10,812,964 B2
(45) Date of Patent: Oct. 20, 2020

(54) ADDRESS ASSIGNMENT FOR INITIAL AUTHENTICATION

(75) Inventors: Stephen McCann, Southampton (GB); Michael Peter Montemurro, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 165 days.

(21) Appl. No.: 13/547,880

(22) Filed: Jul. 12, 2012

(65) Prior Publication Data
US 2014/0016612 A1  Jan. 16, 2014

(51) Int. Cl.
*H04W 36/14* (2009.01)
*H04W 8/08* (2009.01)

(52) U.S. Cl.
CPC ............ *H04W 8/087* (2013.01); *H04W 36/14* (2013.01)

(58) Field of Classification Search
CPC ..... H04W 36/08; H04W 36/18; H04W 36/04; H04W 36/0016; H04W 36/005; H04W 36/0083
USPC .......................................... 370/331; 455/437
See application file for complete search history.

(56) References Cited

U.S. PATENT DOCUMENTS

| | | | |
|---|---|---|---|
| 6,493,561 B1 | 12/2002 | Hasegawa | |
| 7,010,305 B2 | 3/2006 | Immonen et al. | |
| 7,065,645 B2 | 6/2006 | Teicher | |
| 7,151,764 B1 | 12/2006 | Heinonen et al. | |
| 7,187,691 B2 | 3/2007 | Gavette | |
| 7,277,932 B2 | 10/2007 | Adachi et al. | |
| 7,376,097 B2* | 5/2008 | Yegin | H04L 29/12009 370/328 |
| 7,606,209 B2 | 10/2009 | Watanabe | |
| 7,683,773 B1 | 3/2010 | Goodall et al. | |
| 7,684,333 B1 | 3/2010 | Dasylva et al. | |
| 8,170,481 B2 | 5/2012 | Rangarajan et al. | |
| 8,274,908 B2 | 9/2012 | Hsin et al. | |
| 8,374,122 B2 | 2/2013 | Meier et al. | |

(Continued)

FOREIGN PATENT DOCUMENTS

| | | |
|---|---|---|
| CN | 1893396 A | 1/2007 |
| CN | 1969529 A | 5/2007 |

(Continued)

OTHER PUBLICATIONS

Nakano, Hiroki "Upper Layer Data on Management Frames" IEEE 802.11—Task Group AI Doc. 11/1003r1 (Jul. 2011, retrieved from: http://www.ieee802.org/11/Reports/tgai_update.htm).*

(Continued)

*Primary Examiner* — Brian P Cox
(74) *Attorney, Agent, or Firm* — Conley Rose, P. C.; J. Robert Brown, Jr.; Gayatry S. Nair

(57) ABSTRACT

A mobile device may transition between Extended Service Set ("ESS") networks while maintaining the same internet protocol ("IP") address while transitioning. The transition may occur seamlessly, such that a consumer never loses the network connection despite transitioning between networks. The mobile device may receive an IP address from a pool of addresses, such that the mobile device can keep that IP address as it is transitions between networks that each have access to the pool. The assignment of the IP address to the mobile device is from the pool of IP addresses rather than from the AP.

16 Claims, 7 Drawing Sheets

(56) References Cited

U.S. PATENT DOCUMENTS

| | | |
|---|---|---|
| 8,442,024 B2 | 5/2013 | Montemurro et al. |
| 8,458,279 B2 | 6/2013 | Montemurro et al. |
| 8,463,175 B2 | 6/2013 | Bajko |
| 8,514,807 B2 | 8/2013 | Kim et al. |
| 8,594,064 B2 | 11/2013 | Kaushik et al. |
| 8,605,673 B2 | 12/2013 | Xiao et al. |
| 8,626,073 B2 | 1/2014 | Ruuska |
| 8,681,769 B2 | 3/2014 | Montemurro et al. |
| 8,750,180 B2 | 6/2014 | McCann et al. |
| 8,775,533 B2 | 7/2014 | Hassan et al. |
| 8,792,489 B2 | 7/2014 | Anantharam et al. |
| 8,868,071 B2 | 10/2014 | Ha et al. |
| 8,879,455 B1 | 11/2014 | Stephenson et al. |
| 8,897,788 B2 | 11/2014 | Ruuska |
| 8,929,346 B2 | 1/2015 | Montemurro et al. |
| 8,942,221 B2 | 1/2015 | McCann et al. |
| 9,137,621 B2 | 9/2015 | McCann et al. |
| 9,204,299 B2 | 12/2015 | McCann et al. |
| 10,470,106 B2 | 11/2019 | Bajko et al. |
| 2002/0086675 A1 | 7/2002 | Mansour |
| 2002/0141369 A1* | 10/2002 | Perras .............. 370/338 |
| 2002/0159418 A1 | 10/2002 | Rudnick et al. |
| 2002/0169883 A1 | 11/2002 | Bright et al. |
| 2003/0103521 A1 | 6/2003 | Raphaeli et al. |
| 2003/0117984 A1 | 6/2003 | Gavette |
| 2003/0134636 A1 | 7/2003 | Sundar et al. |
| 2003/0217168 A1 | 11/2003 | Adachi et al. |
| 2004/0014422 A1 | 1/2004 | Kallio |
| 2004/0090958 A1 | 5/2004 | Park et al. |
| 2004/0199661 A1 | 10/2004 | Murdock |
| 2005/0060319 A1 | 3/2005 | Douglas |
| 2005/0090259 A1 | 4/2005 | Jain et al. |
| 2005/0097362 A1 | 5/2005 | Winget et al. |
| 2005/0111419 A1 | 5/2005 | Kwon et al. |
| 2005/0210523 A1 | 9/2005 | Parnell et al. |
| 2005/0286456 A1 | 12/2005 | McNew |
| 2006/0067526 A1 | 3/2006 | Faccin et al. |
| 2006/0109113 A1 | 5/2006 | Reyes et al. |
| 2006/0114928 A1 | 6/2006 | Utsunomiya et al. |
| 2006/0142034 A1 | 6/2006 | Wentink et al. |
| 2006/0153230 A1 | 7/2006 | Miyata et al. |
| 2006/0221901 A1 | 10/2006 | Yaqub et al. |
| 2006/0264245 A1 | 11/2006 | Luo |
| 2007/0025297 A1 | 2/2007 | Lee et al. |
| 2007/0041344 A1 | 2/2007 | Yaqub et al. |
| 2007/0064655 A1 | 3/2007 | Ruuska |
| 2007/0064660 A1 | 3/2007 | Qi et al. |
| 2007/0086359 A1 | 4/2007 | Yaqub |
| 2007/0110018 A1 | 5/2007 | Delaney et al. |
| 2007/0110092 A1 | 5/2007 | Kangude et al. |
| 2007/0124592 A1 | 5/2007 | Oyama |
| 2007/0153732 A1 | 7/2007 | Yao |
| 2007/0230389 A1 | 10/2007 | Amann et al. |
| 2007/0230423 A1 | 10/2007 | Yoshida et al. |
| 2007/0243888 A1 | 10/2007 | Faccin |
| 2007/0297438 A1 | 12/2007 | Meylan et al. |
| 2008/0031212 A1 | 2/2008 | Ogura |
| 2008/0049761 A1 | 2/2008 | Lin et al. |
| 2008/0057992 A1 | 3/2008 | Griffin |
| 2008/0095048 A1 | 4/2008 | Zhong |
| 2008/0096580 A1 | 4/2008 | Montemurro |
| 2008/0114857 A1* | 5/2008 | Snider .............. G06Q 30/02 709/217 |
| 2008/0123607 A1 | 5/2008 | Jokela |
| 2008/0141031 A1 | 6/2008 | Oba et al. |
| 2008/0151796 A1 | 6/2008 | Jokela |
| 2008/0178277 A1 | 7/2008 | Oba et al. |
| 2008/0186962 A1 | 8/2008 | Sinha |
| 2008/0261574 A1 | 10/2008 | Rinta-Aho et al. |
| 2008/0270534 A1 | 10/2008 | Xia et al. |
| 2008/0298333 A1 | 12/2008 | Seok |
| 2009/0010399 A1 | 1/2009 | Kim et al. |
| 2009/0031138 A1 | 1/2009 | Nakhjiri |
| 2009/0046657 A1 | 2/2009 | Kim et al. |
| 2009/0047922 A1 | 2/2009 | Buckley et al. |
| 2009/0047974 A1 | 2/2009 | Quinn |
| 2009/0067326 A1 | 3/2009 | Perrot et al. |
| 2009/0067397 A1 | 3/2009 | Seok |
| 2009/0116647 A1 | 5/2009 | Korus et al. |
| 2009/0156213 A1* | 6/2009 | Spinelli et al. .............. 455/436 |
| 2009/0177759 A1 | 7/2009 | Ogawa et al. |
| 2009/0245184 A1 | 10/2009 | Torres et al. |
| 2009/0247111 A1 | 10/2009 | Sennett et al. |
| 2009/0252165 A1 | 10/2009 | Zhang et al. |
| 2009/0296688 A1 | 12/2009 | Bakker et al. |
| 2009/0296689 A1 | 12/2009 | Bakker et al. |
| 2009/0298458 A1 | 12/2009 | Bakker et al. |
| 2009/0310692 A1 | 12/2009 | Kafle et al. |
| 2009/0325566 A1 | 12/2009 | Bell et al. |
| 2010/0118831 A1* | 5/2010 | Chen .............. H04L 61/2015 370/331 |
| 2010/0146272 A1 | 6/2010 | Centonza et al. |
| 2010/0169953 A1 | 7/2010 | Hofer et al. |
| 2010/0190498 A1 | 7/2010 | Ha et al. |
| 2010/0216434 A1 | 8/2010 | Marcellino et al. |
| 2010/0255864 A1 | 10/2010 | Alfano et al. |
| 2010/0271978 A1 | 10/2010 | Gupta et al. |
| 2010/0275249 A1 | 10/2010 | McCann et al. |
| 2010/0279684 A1 | 11/2010 | Salkintzis |
| 2010/0293293 A1* | 11/2010 | Beser .............. 709/238 |
| 2010/0325714 A1 | 12/2010 | Iyer et al. |
| 2011/0028093 A1 | 2/2011 | Patel et al. |
| 2011/0040969 A1 | 2/2011 | Yao et al. |
| 2011/0047382 A1 | 2/2011 | Wang et al. |
| 2011/0055218 A1 | 3/2011 | Capuozzo et al. |
| 2011/0072101 A1 | 3/2011 | Forssell et al. |
| 2011/0103232 A1 | 5/2011 | Sood |
| 2011/0113252 A1 | 5/2011 | Krischer et al. |
| 2011/0149806 A1 | 6/2011 | Verma et al. |
| 2011/0149938 A1 | 6/2011 | Bajko |
| 2011/0154018 A1 | 6/2011 | Edstrom et al. |
| 2011/0188391 A1 | 8/2011 | Sella et al. |
| 2011/0216743 A1* | 9/2011 | Bachmann .............. H04L 63/164 370/331 |
| 2011/0225272 A1 | 9/2011 | Montemurro et al. |
| 2011/0274082 A1 | 11/2011 | Calhoun et al. |
| 2011/0280227 A1 | 11/2011 | McCann et al. |
| 2011/0286405 A1 | 11/2011 | Kim et al. |
| 2012/0008605 A2 | 1/2012 | Montemurro et al. |
| 2012/0017267 A1 | 1/2012 | McCann et al. |
| 2012/0054106 A1 | 3/2012 | Stephenson et al. |
| 2012/0057568 A1 | 3/2012 | Lim et al. |
| 2012/0076117 A1 | 3/2012 | Montemurro et al. |
| 2012/0076118 A1 | 3/2012 | Montemurro et al. |
| 2012/0116886 A1 | 5/2012 | Manku |
| 2012/0134349 A1 | 5/2012 | Jung et al. |
| 2012/0165056 A1 | 6/2012 | Kim et al. |
| 2012/0182970 A1 | 7/2012 | Ding et al. |
| 2012/0191780 A1 | 7/2012 | Sato et al. |
| 2012/0218918 A1 | 8/2012 | Takae et al. |
| 2012/0230308 A1 | 9/2012 | Saito et al. |
| 2012/0239755 A1 | 9/2012 | Filgueiras et al. |
| 2012/0243524 A1 | 9/2012 | Verma et al. |
| 2012/0244902 A1 | 9/2012 | Saito et al. |
| 2012/0246468 A1 | 9/2012 | Gabor |
| 2012/0281609 A1* | 11/2012 | Kasslin et al. .............. 370/312 |
| 2012/0296986 A1 | 11/2012 | Hassan et al. |
| 2013/0012260 A1 | 1/2013 | Salkintzis et al. |
| 2013/0028245 A1 | 1/2013 | Oerton et al. |
| 2013/0034023 A1 | 2/2013 | Jung |
| 2013/0039275 A1 | 2/2013 | Patil et al. |
| 2013/0051303 A1 | 2/2013 | Huang et al. |
| 2013/0064175 A1 | 3/2013 | Pandey et al. |
| 2013/0065627 A1 | 3/2013 | Jung et al. |
| 2013/0065633 A1 | 3/2013 | Sridhara et al. |
| 2013/0066936 A1 | 3/2013 | Krishnan et al. |
| 2013/0070738 A1 | 3/2013 | McCann et al. |
| 2013/0070739 A1 | 3/2013 | McCann et al. |
| 2013/0072248 A1 | 3/2013 | Bajko |
| 2013/0148643 A1 | 6/2013 | Abraham et al. |
| 2013/0166759 A1 | 6/2013 | Rajamani et al. |
| 2013/0170351 A1 | 7/2013 | Reznik et al. |
| 2013/0176897 A1* | 7/2013 | Wang .............. H04W 12/06 370/254 |

(56) References Cited

U.S. PATENT DOCUMENTS

| | | | |
|---|---|---|---|
| 2013/0177002 A1 | 7/2013 | Sun et al. | |
| 2013/0208582 A1* | 8/2013 | Wijnands | H04L 49/552 370/218 |
| 2013/0227152 A1 | 8/2013 | Lee et al. | |
| 2013/0231151 A1 | 9/2013 | Kneckt et al. | |
| 2013/0259034 A1 | 10/2013 | Klein et al. | |
| 2013/0259038 A1 | 10/2013 | Anantharam et al. | |
| 2013/0259040 A1 | 10/2013 | Anantharam et al. | |
| 2013/0262850 A1 | 10/2013 | Canpolat et al. | |
| 2013/0276076 A1 | 10/2013 | Gupta et al. | |
| 2013/0281056 A1 | 10/2013 | Abraham et al. | |
| 2013/0282793 A1 | 10/2013 | Swings et al. | |
| 2013/0301607 A1* | 11/2013 | McCann | H04W 36/0072 370/331 |
| 2013/0316705 A1 | 11/2013 | Kneckt et al. | |
| 2013/0339478 A1 | 12/2013 | Edge et al. | |
| 2014/0018037 A1 | 1/2014 | Shanmugavadivel et al. | |
| 2014/0050209 A1* | 2/2014 | Bajko | H04W 72/0426 370/338 |
| 2014/0073356 A1 | 3/2014 | Siomina et al. | |
| 2014/0078935 A1 | 3/2014 | Sun | |
| 2014/0086134 A1 | 3/2014 | Smadi et al. | |
| 2014/0091987 A1 | 4/2014 | Lee et al. | |
| 2014/0101441 A1 | 4/2014 | Edstrom et al. | |
| 2014/0164763 A1 | 6/2014 | Cherian et al. | |
| 2014/0223019 A1 | 8/2014 | McCann et al. | |
| 2014/0242985 A1 | 8/2014 | Kneckt et al. | |
| 2014/0286242 A1 | 9/2014 | McCann et al. | |
| 2014/0293978 A1 | 10/2014 | Yang et al. | |
| 2015/0131641 A1* | 5/2015 | Ong | H04W 48/20 370/338 |
| 2015/0248702 A1 | 9/2015 | Chatterton | |
| 2015/0373765 A1 | 12/2015 | Lee et al. | |
| 2017/0318018 A1 | 11/2017 | Huang et al. | |

FOREIGN PATENT DOCUMENTS

| | | |
|---|---|---|
| CN | 101141259 A | 3/2008 |
| CN | 101142788 A | 3/2008 |
| CN | 101150442 A | 3/2008 |
| CN | 101317384 A | 12/2008 |
| CN | 101379801 A | 3/2009 |
| CN | 101395949 A | 3/2009 |
| CN | 101583151 A | 11/2009 |
| CN | 101682539 A | 3/2010 |
| EP | 1 919 154 A1 | 5/2008 |
| EP | 1921818 A2 | 5/2008 |
| EP | 2 076 090 A1 | 7/2009 |
| EP | 2 093 967 A2 | 8/2009 |
| EP | 2445242 A1 | 4/2012 |
| EP | 2661122 A2 | 11/2013 |
| JP | 2002314546 A | 10/2002 |
| JP | 2004186753 A | 7/2004 |
| JP | 2008537657 A | 9/2008 |
| JP | 2008544588 A | 12/2008 |
| TW | 200947966 A1 | 11/2009 |
| WO | 0245456 A1 | 6/2002 |
| WO | 03092218 A1 | 11/2003 |
| WO | 2007082007 A2 | 7/2007 |
| WO | WO 2007/083824 A1 | 7/2007 |
| WO | WO 2007/103055 A2 | 9/2007 |
| WO | 2007116337 A2 | 10/2007 |
| WO | 2008049213 A1 | 5/2008 |
| WO | 2008049214 A1 | 5/2008 |
| WO | 2008107306 A1 | 9/2008 |
| WO | 2009063093 A2 | 5/2009 |
| WO | WO 2009/101861 A1 | 8/2009 |
| WO | WO 2011/056307 | 5/2011 |
| WO | 2011073516 A1 | 6/2011 |
| WO | 2011132174 A1 | 10/2011 |
| WO | 2012060611 A2 | 5/2012 |
| WO | 2012091421 A2 | 7/2012 |

OTHER PUBLICATIONS

Bajko, Gabor "IP Address Configuration During Association" IEEE 802.11—Task Group AI Doc. 11/1014r2 (Sep. 2011, retrieved from: http://www.ieee802.org/11/Reports/tgai_update.htm).*
Bajko, G., "Tutorial on Location and Emergency Services," IEEE, IEEE Meeting Hawaii 2008, Sep. 10, 2008, slides 1-45.
EPO Communication regarding Deficiencies in Written Opinion of the International Searching Authority dated Aug. 1, 2012 for corresponding European Application No. 10798589.7, 2 pages.
EPO Communication regarding Deficiencies in Written Opinion of the International Searching Authority dated Dec. 21, 2012 for corresponding European Application No. 11726170.1, 2 pages.
EPO Communication regarding Deficiencies in Written Opinion of the International Searching Authority dated Dec. 21, 2012 for corresponding European Application No. 11726171.9, 2 pages.
EPO Communication regarding Deficiencies in Written Opinion of the International Searching Authority dated Dec. 21, 2012 for corresponding European Application No. 11726172.7, 2 pages.
EPO Communication regarding Deficiencies in Written Opinion of the International Searching Authority dated Dec. 21, 2012 for corresponding European Application No. 11733699.0, 2 ppages.
EPO Communication regarding Deficiencies in Written Opinion of the International Searching Authority dated Oct. 23, 2012 for corresponding European Application No. 11715272.8, 2 pages.
EPO Communication regarding Deficiencies in Written Opinion of the International Searching Authority dated Oct. 23, 2012 for corresponding European Application No. 11715273.6, 2 pages.
Hiller, T. et al., "A Container Type for the Extensible Authentication Protocol (EAP)," Network Working Group, Internet-Draft, <draft-hiller-eap-tlv-01.txt>, Internet Engineering Task Force Standard Working Draft, The Internet Society, May 2003, 10 pages.
IEEE P802.11 Wireless LANs, "TGae Requirements and Use Cases," Jan. 21, 2010, IEEE 802.11-10/0093r5, 6 pages.
IEEE Standard for Information Technology—Telecommunications and information exchange between systems—Local and metropolitan area networks—Specific requirements, "Part 11: Wireless LAN Medium Access Control (MAC) and Physical Layer (PHY) Specifications, Amendment 1: Radio Resource Measurement of Wireless LANs," IEEE Std 802.11k-2008, IEEE computer Society, Jun. 12, 2008, pp. 5, 58-61, 75-77, 100-105, 127 (244 pages).
IEEE Standard for Information Technology—Telecommunications and information exchange between systems—Local and metropolitan area networks—Specific requirements, "Part 11; Wireless LAN Medium Access Control (MAC) and Physical Layer (PHY) Specifications, Amendment 9: Interworking with External Networks," IEEE Std 802.11u-2011, Feb. 25, 2011, pp. 8, 75-86 (208 pages).
IEEE Standard for Information Technology—Telecommunications and information exchange between systems—Local and metropolitan area networks—Specific requirements, "Part 11; Wireless LAN Medium Access Control (MAC) and Physical Layer (PHY) Specifications," IEEE Std 802.11-2012, Mar. 29, 2012, pp. 54, 91, 196-199, 580-584, 712-726, 742-743, 1145-1156 (2793 pages).
IEEE Standard for Information Technology, "Part 11: Wireless LAN Medium Access Control (MAC) and Physical Layer (PHY) specifications, Amendment 8: Medium Access Control (MAC) Quality of Service Enhancements," IEEE Std 802.11e—2005, Nov. 11, 2005, 211 pages.
International Preliminary Report on Patentability dated Nov. 20, 2012 for corresponding International Application No. PCT/IB2011/001006, 10 pages.
International Preliminary Report on Patentability dated Nov. 20, 2012 for corresponding International Application No. PCT/IB2011/001008, 10 pages.
International Preliminary Report on Patentability dated Nov. 20, 2012 for corresponding International Application No. PCT/IB2011/001018, 7 pages.
International Preliminary Report on Patentability dated Nov. 20, 2012 for corresponding International Application No. PCT/IB2011/001023, 6 pages.

(56) References Cited

OTHER PUBLICATIONS

International Preliminary Report on Patentability dated Sep. 27, 2012 for corresponding International Patent Application No. PCT/IB2011/051040, 9 pages.
International Preliminary Report on Patentability dated Sep. 27, 2012 for corresponding International Patent Application No. PCT/IB2011/051044, 9 pages.
International Search Report and Written Opinion dated Dec. 10, 2012 for corresponding International Application No. PCT/CA2012/050635, 10 pages.
International Search Report and Written Opinion dated Jan. 9, 2013 for PCT Application No. PCT/CA2012/050793, 9 pages.
International Search Report and Written Opinion dated Jul. 27, 2011 for corresponding International Application No. PCT/IB2011/001006, 14 pages.
International Search Report and Written Opinion dated Jul. 27, 2011 for corresponding International Application No. PCT/IB2011/001008, 14 pages.
International Search Report and Written Opinion dated Jun. 30, 2011 in corresponding application No. PCT/IB2011/051040, 14 pages.
International Search Report and Written Opinion dated Jun. 30, 2011 in corresponding application No. PCT/IB2011/051044, 14 pages.
International Search Report and Written Opinion dated May 9, 2011 for corresponding International Application No. PCT/IB2010/002932, 12 pages.
International Search Report and Written Opinion dated Nov. 28, 2011 for corresponding International Application No. PCT/IB2011/001018, 10 pages.
International Search Report and Written Opinion dated Oct. 5, 2011 for corresponding International Application No. PCT/IB2011/001023, 11 pages.
Li, W. et al., "A Reliable Active Scanning Scheme for the IEEE 802.11 MAC Layer Handoff," University of Cincinnati, Sep. 8, 2003, pp. 71-74.
McCann, S., IEEE P802.11, Wireless LANs, Emergency URN Information, IEEE 802.11-10/0026r1, Jan. 2010, 6 pages.
Rosen et al, "Framework for Emergency Calling Using Internet Multimedia; draft-ietf-ecrit-framework-10," IETF, Internet Society (ISOC) 4, Jul. 27, 2009, pp. 1-37.
Schulzrinne et al., "Extensions to the Emergency Services Architecture for dealing with Unauthenticated and Unauthorized Devices; draft-schulzrinne-ecrit-unauthenticated-access-06.txt," IETF, Internet Society (ISOC) 6, Oct. 26, 2009, pp. 1-23.
International Preliminary Report on Patentability and Written Opinion of the International Searching Authority for PCT Application No. PCT/CA2013/050539 dated Jan. 13, 2015 (5 pp.).
Lin et al., "Mobile Intelligent Agent Technologies to Support Intelligent Handover Strategy," *Proceedings of the Workshop on Wireless Ad Hoc and Sensor Network*, vol. 1, 2006, http://acnlab.csie.ncu.edu.tw/myreview/FILES/CR2/p56.pdf (8 pp.).
Search Report (English translation) completed Dec. 24, 2014 from the Office Action dated Dec. 27, 2014 for ROC (Taiwan) Pat. Appln. No. 102122238 (1 pg.).
PCT International Search Report; PCT/CA2013/050539; dated Sep. 16, 2013; 3 pages.
PCT Written Opinion of the International Searching Authority; PCT/CA2013/050539; dated Sep. 16, 2013; 4 pages.
Cao, Z., et al.; "DHCPv4 and DHCPv6 Options for Access Network Query Protocol Servers"; draft-cao-dhc-anqp-option-00; Jul. 9, 2012; 8 pages.
Chinese Office Action as Received in Co-pending Application No. 201180033260.3 dated Jan. 20, 2016; 3 pages. (No English translation available).
European Extended Search Report; Application No. 13816111.2; dated Feb. 3, 2016; 7 pages.
European Extended Search Report; Application No. 13817511.2; dated Feb. 12, 2016; 9 pages.
Chinese Office Action; Application No. 201180023969.5; dated Oct. 30, 2014; 20 pages.
Chinese Office Action; Application No. 201180023969.5; dated Jul. 20, 2015; 10 pages.
European Examination Report; Application No. 11715273.6; dated Jan. 13, 2016; 6 pages.
Japanese Office Action; Application No. 2012-557644; dated Oct. 17, 2013; 5 pages.
Japanese Office Action as Received in Co-pending Application No. 2014-019062 dated Nov. 21, 2014; 2 pages. (No English translation available).
Canadian Office Action; Application No. 2,799,291; dated May 28, 2014; 3 pages.
Canadian Office Action; Application No. 2,799,291; dated Jun. 2, 2015; 4 pages.
Chinese Office Action; Application No. 201180033223.2; dated Jan. 22, 2015; 15 pages.
Canadian Office Action; Application No. 2,799,292; dated May 27, 2014; 3 pages.
Canadian Office Action; Application No. 2,799,292; dated Jun. 8, 2015; 4 pages.
Chinese Office Action as Received in Co-pending Application No. 201180033260.3 dated Jun. 3, 2015; 10 pages. (No English translation available).
Canadian Office Action; Application No. 2,799,295; dated Oct. 31, 2014; 4 pages.
Chinese Office Action as Received in Co-pending Application No. 201180033296.1 dated Dec. 21, 2014; 7 pages. (No English translation available).
Chinese Office Action as Received in Co-pending Application No. 201180033296.1 dated Dec. 16, 2015; 3 pages. (No English translation available).
European Examination Report; Application No. 11726172.7; dated Feb. 10, 2015; 4 pages.
Canadian Office Action; Application No. 2,799,293; dated Jun. 16, 2014; 2 pages.
Canadian Office Action; Application No. 2,799,293; dated Jul. 13, 2015; 6 pages.
Chinese Office Action; Application No. 201180033197.3; dated Dec. 12, 2014; 20 pages.
European Examination Report; Application No. 11733699.0; dated Jan. 15, 2016; 6 pages.
European Extended Search Report; Application No. 12831400.2; dated Jul. 3, 2015; 10 pages.
Korean Office Action as Received in Co-pending Application No. 10-2014-7008921 dated Mar. 23, 2015; 3 pages. (No English translation available).
European Extended Search Report; Application No. 12847065.5; dated Jul. 13, 2015; 11 pages.
Korean Office Action as Received in Co-pending Application No. 10-2014-7015745 dated Apr. 29, 2015; 6 pages. (No English translation available).
Taiwan Search Report; Application No. 102124777; dated Dec. 9, 2014; 1 page.
PCT International Search Report; Application No. PCT/CA2013/050540; dated Sep. 17, 2013; 3 pages.
PCT Written Opinion of the International Searching Authority; Application No. PCT/CA2013/050540; dated Sep. 17, 2013; 3 pages.
Taiwan Office Action; Application No. 102116774; dated Oct. 27, 2014; 16 pages.
Taiwan Office Action; Application No. 102116774; dated Jun. 12, 2015; 16 pages.
PCT International Search Report; Application No. PCT/CA2013/050362; dated Aug. 2, 2013; 4 pages.
PCT Written Opinion of the International Searching Authority; Application No. PCT/CA2013/050362; dated Aug. 2, 2013; 5 pages.
European Extended Search Report; Application No. 13788377.3; dated Dec. 21, 2015; 8 pages.
PCT International Search Report; Application No. PCT/CA2014/050060; dated Apr. 15, 2014; 3 pages.
PCT International Search Report; Application No. PCT/CA2014/050060; dated Apr. 15, 2014; 7 pages.

(56) References Cited

OTHER PUBLICATIONS

McCann, Stephen, et al.; U.S. Appl. No. 14/854,685, filed Sep. 15, 2015; Title: Wireless Network Service Transaction Protocol; 57 pages.
"Draft Standard for Local and Metropolitan Area Networks: Media Independent Handover Services"; IEEE P802.21/D8.0; Dec. 2007; 343 pages.
Advisory Action dated Oct. 15, 2015; U.S. Appl. No. 14/298,289, filed Jun. 6, 2014; 3 pages.
Chinese Office Action as Received in Co-pending Application No. 201180033223.2 dated Oct. 10, 2015; 5 pages. (No English translation available).
Chinese Office Action; Application No. 201180033197.3; dated Aug. 18, 2015; 16 pages.
Canadian Office Action; Application No. 2,848,754; dated Sep. 24, 2015; 4 pages.
Korean Notice of Allowance; Application No. 10-2014-7008921; dated Sep. 18, 2015; 3 pages.
Taiwan Search Report; Application No. 102122238; dated Sep. 21, 2015; 7 pages.
McCann, Stephen, et al.; U.S. Appl. No. 14/952,574, filed Nov. 25, 2015; Title: Extended Service Set Transitions in Wireless Networks; 49 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 1: pp. 1-1369).
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 2: pp. 1370-2778).
"Wi-Fi Peer-to-Peer (P2P) Technical Specification"; Draft Version 1.14; Wi-Fi Alliance Technical Committee P2P Task Group; Jun. 25, 2010; 22 pages.
Barber, Phillip, et al.; "GAS Version Control in 11ai"; Document: IEEE 802.11-11/1498-01-00ai; Oct. 24, 2011; 16 pages.
Bumiller, George; "Notes on Interworking with External Networks"; Document: IEEE 802.11-09/1272r2; Jul. 22, 2010; 156 pages.
Office Action dated Jun. 29, 2012; U.S. Appl. No. 12/780,603, filed May 14, 2010; 37 pages.
Office Action dated Jan. 2, 2013; U.S. Appl. No. 12/780,603, filed May 14, 2010; 35 pages.
Final Office Action dated Jun. 5, 2013; U.S. Appl. No. 12/780,603, filed May 14, 2010; 30 pages.
Office Action dated Dec. 17, 2013; U.S. Appl. No. 12/780,603, filed May 14, 2010; 27 pages.
Final Office Action dated Jun. 3, 2014; U.S. Appl. No. 12/780,603, filed May 14, 2010; 28 pages.
Notice of Allowance dated Sep. 2, 2014; U.S. Appl. No. 12/780,603, filed May 14, 2010; 7 pages.
Office Action dated Jun. 8, 2012; U.S. Appl. No. 12/780,709, filed May 14, 2010; 6 pages.
Office Action dated Aug. 23, 2012; U.S. Appl. No. 12/780,709, filed May 14, 2010; 13 pages.
Notice of Allowance dated Jan. 18, 2013; U.S. Appl. No. 12/780,709, filed May 14, 2010; 11 pages.
Office Action dated Apr. 3, 2012; U.S. Appl. No. 12/780,722, filed May 14, 2010; 15 pages.
Notice of Allowance dated Oct. 19, 2012; U.S. Appl. No. 12/780,722, filed May 14, 2010; 6 pages.
Notice of Allowance dated Feb. 5, 2013; U.S. Appl. No. 12/780,722, filed May 14, 2010; 6 pages.
Office Action dated Jul. 19, 2012; U.S. Appl. No. 12/780,614, filed May 14, 2010; 14 pages.
Office Action dated Nov. 16, 2012; U.S. Appl. No. 12/780,614, filed May 14, 2010; 6 pages.
Office Action dated Mar. 25, 2013; U.S. Appl. No. 12/780,614, filed May 14, 2010; 10 pages.
Final Office Action dated Jul. 19, 2013; U.S. Appl. No. 12/780,614, filed May 14, 2010; 7 pages.
Notice of Allowance dated Oct. 31, 2013; U.S. Appl. No. 12/780,614, filed May 14, 2010; 7 pages.
Office Action dated Nov. 16, 2012; U.S. Appl. No. 13/045,622, filed Mar. 11, 2011; 19 pages.
Final Office Action dated Jul. 12, 2013; U.S. Appl. No. 13/045,622, filed Mar. 11, 2011; 17 pages.
Office Action dated Oct. 11, 2012; U.S. Appl. No. 13/045,658, filed Mar. 11, 2011; 11 pages.
Final Office Action dated May 15, 2013; U.S. Appl. No. 13/045,658, filed Mar. 11, 2011; 11 pages.
Office Action dated Jul. 12, 2013; U.S. Appl. No. 13/234,799, filed Sep. 16, 2011; 16 pages.
Notice of Allowance dated Jan. 30, 2014; U.S. Appl. No. 13/234,799, filed Sep. 16, 2011; 7 pages.
Office Action dated Apr. 20, 2015; U.S. Appl. No. 14/298,289, filed Jun. 6, 2014; 10 pages.
Final Office Action dated Aug. 5, 2015; U.S. Appl. No. 14/298,289, filed Jun. 6, 2014; 34 pages.
Office Action dated Nov. 16, 2015; U.S. Appl. No. 14/298,289, filed Jun. 6, 2014; 13 pages.
Office Action dated Jul. 11, 2013; U.S. Appl. No. 13/407,444, filed Feb. 28, 2012; 14 pages.
Office Action dated Dec. 31, 2013; U.S. Appl. No. 13/407,444, filed Feb. 28, 2012; 11 pages.
Final Office Action dated Jun. 3, 2014; U.S. Appl. No. 13/407,444, filed Feb. 28, 2012; 11 pages.
Notice of Allowance dated Sep. 17, 2014; U.S. Appl. No. 13/407,444, filed Feb. 28, 2012; 5 pages.
Office Action dated Feb. 4, 2014; U.S. Appl. No. 13/548,864, filed Jul. 13, 2012; 15 pages.
Final Office Action dated Jul. 11, 2014; U.S. Appl. No. 13/548,864, filed Jul. 13, 2012; 10 pages.
Office Action dated Oct. 30, 2014; U.S. Appl. No. 13/548,864, filed Jul. 13, 2012; 10 pages.
Notice of Allowance dated May 1, 2015; U.S. Appl. No. 13/548,864, filed Jul. 13, 2012; 14 pages.
Office Action dated Jan. 14, 2014; U.S. Appl. No. 13/469,618, filed May 11, 2012; 28 pages.
Final Office Action dated Jul. 9, 2014; U.S. Appl. No. 13/469,618, filed May 11, 2012; 31 pages.
Office Action dated Jan. 21, 2015; U.S. Appl. No. 13/469,618, filed May 11, 2012; 26 pages.
Notice of Allowance Jul. 23, 2015; U.S. Appl. No. 13/469,618, filed May 11, 2012; 15 pages.
Office Action dated Jun. 30, 2015; U.S. Appl. No. 13/836,759, filed Mar. 15, 2013; 24 pages.
Notice of Allowance dated Nov. 18, 2015; U.S. Appl. No. 13/836,759, filed Mar. 15, 2013; 33 pages.
Taiwan Office Action; Application No. 100108467; dated Aug. 9, 2013; 12 pages.
Canadian Office Action; Application No. 2,793,375; dated Oct. 18, 2013; 3 pages.
Canadian Office Action; Application No. 2,793,375; dated Jun. 25, 2014; 3 pages.
Canadian Office Action; Application No. 2,793,375; dated Jul. 10, 2015; 5 pages.
McCann, Stephen, et al.; U.S. Appl. No. 15/048,669, filed Feb. 19, 2016; Title: Persistent Network Negotiation for Peer to Peer Devices; 45 pages.
Kneckt, Jarkko, et al.; "Active Scanning Enabling FILS"; IEEE 802.11-11/1619r1; Jan. 16, 2012; 15 pages.
Final Office Action dated Mar. 21, 2016; U.S. Appl. No. 14/298,289, filed Jun. 6, 2014; 21 pages.
Office Action dated Mar. 31, 2016; U.S. Appl. No. 14/854,685, filed Sep. 15, 2015; 56 pages.
Office Action dated Apr. 8, 2016; U.S. Appl. No. 14/952,574, filed Nov. 25, 2015; 75 pages.

(56) References Cited

OTHER PUBLICATIONS

Canadian Office Action; Application No. 2,793,375; dated May 2, 2016; 6 pages.
European Examination Report; Application No. 11726170.1; dated May 9, 2016; 8 pages.
Canadian Office Action; Application No. 2,799,292; dated Feb. 23, 2016; 4 pages.
European Examination Report; Application No. 11726171.9; dated May 9, 2016; 8 pages.
Canadian Office Action; Application No. 2,799,295; dated Feb. 24, 2016; 4 pages.
Office Action dated Sep. 23, 2016; U.S. Appl. No. 13/045,658, filed Mar. 11, 2011; 77 pages.
Final Office Action dated Sep. 16, 2016; U.S. Appl. No. 14/854,685, filed Sep. 15, 2015; 18 pages.
Final Office Action dated Oct. 20, 2016; U.S. Appl. No. 14/952,574, filed Nov. 25, 2015; 36 pages.
European Examination Report; Application No. 11733699.0; dated Sep. 6, 2016; 4 pages.
Canadian Office Action; Application No. 2,848,754; dated Aug. 15, 2016; 5 pages.
Canadian Office Action; Application No. 2,872,882; dated Sep. 28, 2016; 4 pages.
European Examination Report; Application No. 13788377.3; dated Oct. 10, 2016; 6 pages.
Campbell, Andrew T., et al.; "Design, Implementation, and Evaluation of Cellular IP"; IEEE Personal Communications; Aug. 2000; 8 pages.
Office Action dated May 2, 2012; U.S. Appl. No. 12/780,614, filed May 14, 2010; 5 pages.
Advisory Action dated Jul. 26, 2013; U.S. Appl. No. 13/045,658, filed Mar. 11, 2011; 3 pages.
Advisory Action dated Jun. 8, 2016; U.S. Appl. No. 14/298,289, filed Jun. 6, 2014; 4 pages.
Office Action dated Aug. 23, 2016; U.S. Appl. No. 14/298,289, filed Jun. 6, 2014; 8 pages.
Canadian Office Action; Application No. 2,799,293; dated Jun. 10, 2016; 5 pages.
European Extended Examination Report; Application No. 14749467.8; dated Jun. 22, 2016; 8 pages.
Notice of Allowance dated Nov. 18, 2016; U.S. Appl. No. 13/045,658, filed Mar. 11, 2011; 7 pages.
Final Office Action dated Jan. 3; 2017; U.S. Appl. No. 14/298,289, filed Jun. 6, 2014; 13 pages.
Notice of Allowance dated Nov. 23, 2016; U.S. Appl. No. 14/854,685, filed Sep. 15, 2015; 13 pages.
Advisory Action dated Jan. 11, 2017; U.S. Appl. No. 14/952,574, filed Nov. 25, 2015; 2 pages.
Office Action dated Feb. 15, 2017; U.S. Appl. No. 14/952,574, filed Nov. 25, 2015; 28 pages.
European Examination Report; Application No. 11715273.6; dated Jan. 25, 2017; 4 pages.
Chinese Office Action as Received in Co-pending Application No. 201280044612.X dated Nov. 28, 2016,; 7 pages. (No English translation available).
Montemurro, Michael Peter, et al.; U.S. Appl. No. 15/460,991, filed Mar. 16, 2017; Title: Negotiation of Quality of Service (QoS) Information for Network Management Traffic in a Wireless Local Area Network (WLAN); 49 pages.
McCann, Stephen, et al.; U.S. Appl. No. 15/483,759, filed Apr. 10, 2017; Title: Wireless Network Service Transaction Protocol; 59 pages.
Office Action dated Mar. 30, 2017; U.S. Appl. No. 14/298,289, filed Jun. 6, 2014; 7 pages.
Canadian Office Action; Application No. 2,793,375; dated Apr. 7, 2017; 4 pages.
Chinese Office Action; Application No. 201280066681.0; dated Mar. 10, 2017; 21 pages.
European Examination Report; Application No. 13816111.2; dated Mar. 29, 2017; 4 pages.

European Examination Report; Application No. 13817511.2; dated Mar. 8, 2017; 5 pages.
Wi-Fi Alliance; "Wi-Fi Peer-to-Peer (P2P) Technical Specification"; Version 1.2; 2010; 159 pages.
Notice of Allowance dated Jun. 14, 2017; U.S. Appl. No. 14/298,289, filed Jun. 6, 2014; 8 pages.
Notice of Allowance dated Jun. 30, 2017; U.S. Appl. No. 14/952,574, filed Nov. 25, 2015; 24 pages.
Office Action dated Aug. 11, 2017; U.S. Appl. No. 15/048,669, filed Feb. 19, 2016; 37 pages.
Canadian Office Action; Application No. 2,799,293; dated May 17, 2017; 4 pages.
European Examination Report; Application No. 11733699.0; dated Jul. 19, 2017; 4 pages.
Canadian Office Action; Application No. 2,848,754; dated Jul. 28, 2017; 4 pages.
Chinese Office Action as Received in Co-pending Application No. 201280044612.X dated Jun. 23, 2017; 5 pages. (No English translation available).
European Examination Report; Application No. 12831400.2; dated Jun. 16, 2017; 6 pages.
Canadian Office Action; Application No. 2,872,882; dated Jun. 6, 2017; 3 pages.
McCann, Stephen, et al.; U.S. Appl. No. 15/785,121, filed Oct. 16, 2017; Title: Discovering Network Information Available via Wireless Networks; 65 pages.
Notice of Allowance dated Dec. 8, 2017; U.S. Appl. No. 15/048,669, filed Feb. 19, 2016; 10 pages.
Chinese Office Action; Application No. 201280066681.0; dated Sep. 11, 2017; 18 pages.
European Examination Report; Application No. 13816111.2; dated Dec. 4, 2017; 6 pages.
European Examination Report; Application No. 13817511.2; dated Oct. 24, 2017; 4 pages.
Office Action dated Feb. 22, 2018; U.S. Appl. No. 15/483,759, filed Apr. 10, 2017; 68 pages.
Office Action dated Mar. 22, 2018; U.S. Appl. No. 15/811,259, filed Nov. 13, 2017; 70 pages.
Chinese Office Action; Application No. 201280066681.0; dated Jan. 15; 2018; 12 pages.
McCann, Stephen, et al.; U.S. Appl. No. 15/811,259, filed Nov. 13, 2017; Title: Extended Service Set Transitions in Wireless Networks; 45 pages.
Notice of Allowance dated Jul. 18, 2018; U.S. Appl. No. 15/483,759, filed Apr. 10, 2017; 13 pages.
European Extended Search Report; Application No. 18157024.3; dated May 25, 2018; 10 pages.
European Summons to Attend Oral Proceedings; Application No. 12831400.2; dated May 25, 2018; 9 pages.
European Examination Report; Application No. 13816111.2; dated May 14, 2018; 4 pages.
European Examination Report; Application No. 13788377.3; dated Jun. 11, 2018; 7 pages.
McCann, Stephen, et al.; U.S. Appl. No. 16/261,131, filed Jan. 29, 2019; Title: Discovering Network Information Available via Wireless Networks; 65 pages.
Wi-Fi Alliance; "Wi-Fi Peer-to-Peer (P2P) Technical Specification"; Version 1.1; 2010; 159 pages.
Office Action dated Nov. 16, 2018; U.S. Appl. No. 15/460,991, filed Mar. 16, 2017; 94 pages.
Notice of Allowance dated Nov. 30, 2018; U.S. Appl. No. 15/785,121, filed Oct. 16, 2017; 7 pages.
Advisory Action dated Jan. 14, 2019; U.S. Appl. No. 15/811,259, filed Nov. 13, 2017; 2 pages.
European Examination Report; Application No. 11726170.1; dated Nov. 19, 2018; 6 pages.
European Examination Report; Application No. 11726171.9; dated Nov. 20, 2018; 5 pages.
Chinese Reexamination Notification as Received in Co-pending Application No. 201280066681.0 dated Dec. 29, 2018; 13 pages. (No English translation available).
European Summons to Attend Oral Proceedings; Application No. 13816111.2; Jan. 21, 2019; 6 pages.

(56) References Cited

OTHER PUBLICATIONS

European Examination Report; Application No. 14749467.8; dated Dec. 7, 2018; 7 pages.
McCann, Stephen, et al.; U.S. Appl. No. 16/176,467, filed Oct. 31, 2018; Title: Wireless Network Service Transaction Protocol; 59 pages.
Office Action dated Sep. 11, 2018; U.S. Appl. No. 15/785,121, filed Oct. 16, 2017; 59 pages.
Final Office Action dated Nov. 1, 2018; U.S. Appl. No. 15/811,259, filed Nov. 13, 2017; 18 pages.
Indian Office Action; Application No. 7976/CHENP/2012; dated Aug. 30, 2018; 6 pages.
Canadian Office Action; Application No. 2,854,947; dated Aug. 9, 2018; 3 pages.
Chinese Reexamination Notification as Received in Co-pending Application No. 201280066681.0 dated Aug. 29, 2018; 13 pages. (No English translation available).
European Examination Report; Application No. 12847065.5; dated Oct. 12, 2018; 6 pages.
European Extended Search Report; Application No. 18166755.1; dated Aug. 22, 2018; 6 pages.
European Extended Search Report; Application No. 19154310.7; dated Apr. 2, 2019; 15 pages.
Notice of Allowance dated Mar. 11, 2019; U.S. Appl. No. 15/460,991, filed Mar. 16, 2017; 12 pages.
Notice of Allowance dated Feb. 25, 2019; U.S. Appl. No. 15/811,259, filed Nov. 13, 2017; 13 pages.
Canadian Office Action; Application No. 2,878,980; dated Feb. 19, 2019; 3 pages.
Canadian Office Action; Application No. 2,878,736; dated Mar. 6, 2019; 6 pages.
Montemurro, Michael Peter, et al.; U.S. Appl. No. 16/428,350, filed May 31, 2019; Title: Negotiation of Quality of Service (QoS) Information for Network Management Traffic in a Wireless Local Area Network (WLAN); 50 pages.
Frikha, Mounir, et al.; "Micro Mobility in the IP Networks"; Telecommunication Systems; Apr. 2006; 16 pages.
European Extended Search Report; Application No. 19171474.0; dated May 23, 2019; 11 pages.
Canadian Office Action; Application No. 2,854,947; dated Jun. 25, 2019; 5 pages.
Chinese Rejection Decision as Received in Co-pending Application No. 201280066681.0 dated May 31, 2019; 20 pages. (No English translation available).
European Examination Report; Application No. 18166755.1; dated Jul. 31, 2019; 4 pages.
European Extended Search Report; Application No. 19172928.4; dated Jul. 19, 2019; 7 pages.
Office Action dated Nov. 27, 2019; U.S. Appl. No. 16/261,131, flied Jan. 29, 2019; 78 pages.
European Extended Search Report; Application No. 19191611.3; dated Sep. 9, 2019; 14 pages.
"Proxy from FOLDOC"; Sep. 3, 2007; Retrieved from: http://foldoc.org/proxy on Dec. 17, 2019; 2 pages.
Georgantas, Konstantinos; "Fast Initial Authentication, a New Mechanism to Enable Fast WLAN Mobility"; Master of Thesis; MSc Communication Systems, School of ICT, Royal Institute of Technology; Stockholm, Sweden; Sep. 2011; 65 pages.
Office Action dated Dec. 27, 2019; U.S. Appl. No. 16/176,467, filed Oct. 31, 2018; 92 pages.
European Extended Search Report; Application No. 19211770.3; dated Dec. 17, 2019; 7 pages.
European Summons to Attend Oral Proceedings; Application No. 1816675.1, dated Jan. 7, 2020; 7 pages.
European Extended Search Report; Application No. 19211911.3; dated Feb. 12, 2020; 12 pages.
European Examination Report; Application No. 19154310.7; dated Mar. 9, 2020; 5 pages.
European Examination Report; Application No. 14749467.8; dated Jan. 2, 2020; 4 pages.
Gazis, Vangelis, et al.; "Towards the Functional Enhancement of 3GPP Networks with Reconfiguration Capacities"; Wireless Personal Communications; Jun. 2011; 28 pages.
Kempf, J., et al.; "An API for Service Location"; Request for Comments: 2614; Jun. 1999; 92 pages.
Notice of Allowance dated Apr. 8, 2020; U.S. Appl. No. 16/176,467 filed Oct. 31, 2018; 13 pages.
Final Office Action dated Mar. 17, 2020; U.S. Appl. No. 16/261,131 filed Jan. 29, 2019; 12 pages.
Advisory Action dated May 19, 2020; U.S. Appl. No. 16/261,131 filed Jan. 29, 2019; 4 pages.
Chinese Office Action; Application No. 201810013191.3; dated Mar. 19, 2020; 13 pages.
European Brief Communication; Application No. 18166755,1; dated Apr. 23, 2020; 5 pages.
Canadian Office Action; Application No. 2,878,736; dated Apr. 9, 2020; 3 pages.
McCann, Stephen, et al.; U.S. Appl. No. 16/912,249; filed Jun. 25, 2020; Title: Wireless Network Service Transaction Protocol; 57 pages.
Office Action dated Jun. 29, 2020; U.S. Appl. No. 16/261,131, filed Jan. 29, 2019; 12 pages.
Notice of Allowance dated Sep. 3, 2020; U.S. Appl. No. 16/428,350, filed May 31, 2019; 42 pages.
European Examination Report; Application No. 19171474.0; dated Jul. 22, 2020; 5 pages

* cited by examiner

ADDRESS ASSIGNMENT FOR INITIAL AUTHENTICATION

BACKGROUND

Wireless network deployments, such as wireless local area networks ("WLANs"), allow mobile devices to access network and Internet services when within the proximity of wireless communication signals of those wireless networks. Through initial authentication communications with the WLAN, a mobile device or station ("STA") may obtain a network address, such as an Internet Protocol ("IP") address from an access point ("AP"), or an access network. In traditional WLANs, a mobile device associates to a WLAN and may either obtain an IP address using Dynamic Host Configuration Protocol ("DHCP") or make use of a statically configured IP address, which is usually configured locally within the WLAN itself. There is no expedited process for a mobile device to transition between networks without re-requesting an IP address. A mobile device may need to disconnect or disassociate with one network and authenticate/associate with a different network for the transition to occur.

DETAILED DESCRIPTION

Figure 1:
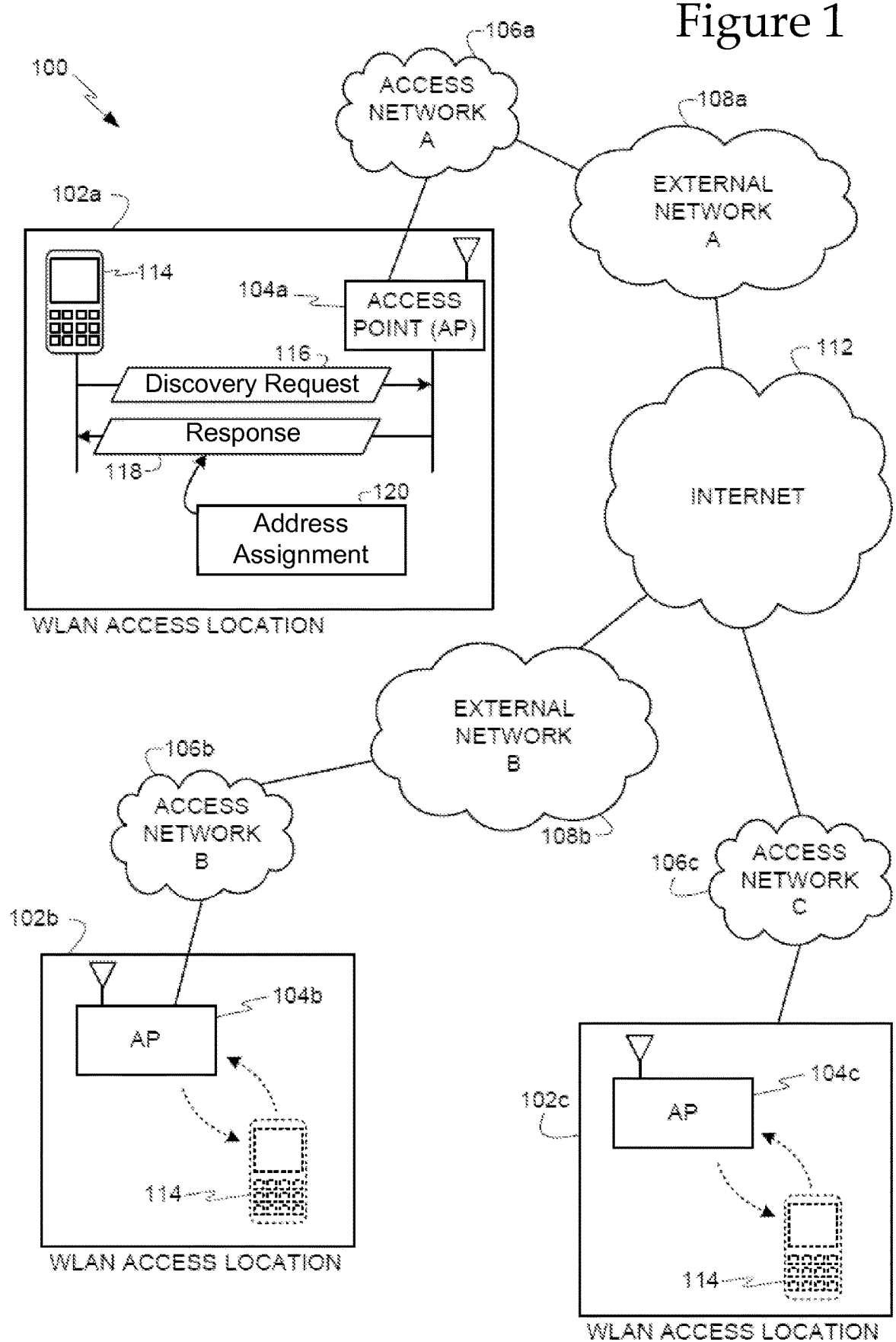
FIG. 1 illustrates a communication network.

The IP connection set-up may be streamlined to allow a mobile device to quickly switch between different WLAN Extended Service Sets ("ESSs"), by maintaining an IP address. The ESS forms a network comprising WLANs. In particular, the IP address assignment may be streamlined by requesting, during WLAN authentication and association, an IP address from a server that accesses a pool of IP addresses. The IP addresses are then provided to a number of networks, which allows a device to transition between the number of networks with an IP address that does not change during the transition. It may be impractical for a mobile device that moves between different networks (e.g. ESSs) to use a statically configured IP addresses for each network because the IP address is unknown between the networks. The usual alternative to using static IP addresses is to obtain an IP address from DHCP typically involving a multiple message exchange, which can take more time than a device uses to authenticate and associate with a WLAN, so the device cannot quickly obtain an IP address. Accordingly, the assignment of IP addresses may be from a central source (e.g. IP server in FIGS. 3-4) with access to a pool of IP addresses that allows the device to maintain the address while transitioning between networks that utilize the IP server.

The disclosed systems and methods allow mobile devices to maintain an address (e.g. an IP address) while transitioning between networks (e.g., ESSs). The transition may occur seamlessly, such that a consumer never loses network connectivity despite transitioning between networks. The mobile device may receive an IP address from a pool of addresses, such that the mobile device can maintain the same IP address as the mobile device transitions between networks. The transition may be enabled using a protocol (e.g. Link Control Protocol ("LCP")) where the mobile device IP address (from an "LCP" pool) remains the same while the mobile device transitions between networks. The transition is enabled because the assignment of the IP address is not from the AP subnet (typically with an associated DHCP server), but rather the assignment of the IP address is from the network.

The communication for enabling such a transition may include the transmission of discovery information associated with a network, to the mobile device, regarding the availability of a suitable protocol prior to association with that network. This pre-association communication may be retrieved through an advertisement protocol, such as Access Network Query Protocol ("ANQP"), which allows a mobile device to retrieve information about a network prior to associating with that network. ANQP may allow a mobile device to request network information or discovery information prior to receiving the IP address and establishing network connectivity. Communications prior to network association may be referred to as pre-association communications. ANQP may allow a device to determine that a network, to which a mobile device may transition to, operates under a particular protocol (e.g. LCP) which allows the same IP address to be utilized during and upon transition to that network.

Link Control Protocol ("LCP") is part of the point-to-point protocol ("PPP") in which sending and receiving devices send out LCP packets that establish the communication techniques. In particular, the LCP protocol may establish, configure, and test data-link Internet connections. Before establishing communications over a point-to-point link, each end of the PPP link sends out LCP packets. The LCP packets may monitor the identity of a linked device and either accept or reject the device. The LCP packets may also include the ability to establish packet size, search for configuration errors, and terminate the link if necessary. Once the LCP packet accepts the link, communications can be transported on the network, otherwise, the link is terminated. As described below, LCP may be an exemplary protocol that is utilized with the IEEE 802.11 WLAN protocols.

The PPP protocol may establish point-to-point link layer connections for establishing layer 2 ("L2") and layer 3 ("L3") (see e.g. FIG. 2) connectivity over a point-to-point link. The PPP protocol may makes use of LCP frames to establish L2 and L3 connectivity. The Internet Protocol Control Protocol ("IPCP") allows a device to request an IP address and Domain Name System ("DNS") configuration over LCP. However the configuration may be insufficient to establish network connectivity over a local area network ("LAN"). The PPP protocol may be used for link layer and IP layer network establishment. The mobile device may use IPCP to request an IP address and DNS server addresses. The PPP protocol may be encapsulated for authentication (e.g. Extended Authentication Protocol ("EAP")) purposes, which may be used by IEEE 802.11 networks.

As described below, networks (e.g. ESSs) that are capable of this transition of the same IP address, will be able to notify mobile devices of this capability with pre-association communications. In other words, a mobile device may need to know if a transition between networks (ESSs) is possible utilizing the same IP address and that information may be conveyed with ANQP. In particular, the networks may advertise whether they access the same pool of IP addresses.

All networks from the same pool would assign IP addresses from the pool and allow transitioning between networks with the same IP address.

The transitioning between networks (e.g. ESSs) may be especially useful in an environment where mobile users are frequently entering and leaving the coverage area of a specific ESS. Every time the mobile device enters an ESS, the mobile device may do an initial link set-up to establish wireless local area network ("WLAN") connectivity, which includes the receiving of an IP address dynamically with DHCP. IEEE 802.11r provides a solution to allow a mobile device to transition between Basic Service Sets ("BSSs"), within the same mobility domain that restricts them to a single network (e.g. ESS). However, each new AP may require a dynamically created IP address.

A basic service set ("BSS") may be a set of stations ("STAs") or mobile devices that can communicate with each other. According to the IEEE 802.11 standard a STA may be a mobile device, an AP or a mesh device "MSTA." Each AP and its mobile devices may be known as a BSS. The BSS may include mobile devices that have successfully synchronized using the JOIN service primitives and one mobile device that has used the START primitive. Membership in a BSS may not imply that wireless communication with all other members of the BSS is possible.

Although not specified, the messages and protocols described below may be bi-directional and can flow from a mobile device to an AP and vice-versa. In infrastructure mode, a single AP together with all associated STAs is called a BSS. Every BSS has an identification (ID) called the BSSID, which may be the MAC address of the AP servicing the BSS. The simplest BSS may include one AP and one STA. There may be two types of BSS: 1) independent BSS (also referred to as IBSS); and 2) infrastructure BSS. An independent BSS ("IBSS") may be an ad-hoc network of STAs that contains no APs, which means they may not connect to any other BSS.

A common distribution system ("DS") and two or more BSSs may create an extended service set ("ESS") a network. The ESS may be a set of one or more interconnected BSSs and integrated LANs that appear as a single BSS to the logical link control layer at any mobile device associated with one of those BSSs. APs in an ESS are connected by a distribution system. The APs communicate amongst themselves to forward traffic from one BSS to another to facilitate movement of mobile devices between BSSs through the distribution system. The distribution system is the backbone of the WLAN and may be constructed of either a wired LAN or wireless network. The distribution system is a thin layer in each AP that determines the destination for traffic received from a BSS. The distribution system determines if traffic should be relayed back to a destination in the same BSS, forwarded on the distribution system to another AP, or sent into the wired network to a destination not in the extended service set. Communications received by an AP from the distribution system are transmitted to the BSS to be received by the destination mobile device.

Network equipment outside of the ESS, views the ESS and all of mobile devices within the ESS as a single MAC-layer network where all mobile devices are physically stationary. Thus, the ESS "hides" the mobility of the mobile devices from everything outside the ESS. In other words, components outside of the ESS need not be aware of or informed about the mobility of the mobile devices within the ESS. This level of indirection provided by the IEEE 802.11 architecture allows existing network protocols that have no concept of mobility to operate correctly with a WLAN where there is mobility. With an ESS, the entire network may appear as an independent basic service set ("IBSS") to the Logical Link Control layer ("LLC"). Accordingly, mobile devices within the ESS may communicate or even move between BSSs transparently to the LLC. Each BSS may have an identity ("ID") called a service set identity ("SSID") which is a 32-byte (maximum) character string. As described below, separate ESSs that access the same pool of IP addresses may assign an IP address to a device such that the IP address can remain the same as the device transitions between those ESSs accessing the same pool of IP addresses.

Mobile devices that transition between networks (e.g. ESSs) may include mobile communication devices, mobile computing devices, or any other device capable of communicating wirelessly with a wireless network. Such devices may also be referred to as terminals, wireless terminals, mobile devices, stations ("STA") or user equipment, and may also include mobile smart phones (e.g., a BlackBerry® smart phone or BlackBerry® Playbook), wireless personal digital assistants ("PDA"), machine to machine equipment, equipment within a smart grid ("SmartGrid"), equipment within a mesh network (an ad-hoc or peer network), laptop/notebook/netbook computers with wireless adapters, etc.

Some mobile devices may transition between ESSs, which may include a wireless local area network ("WLAN"). Network discovery and connectivity in a WLAN may occur through standards that define access, control and communications in networks, such as the communication standard known as IEEE® (Institute for Electrical and Electronics Engineers) 802.11, which, among other things, includes features describing "interworking with external networks." The "interworking" standard is part of the IEEE 802.11-2012 base standard, and was formerly part of the amendment document IEEE 802.11u. Alternatively, the network discovery and connectivity may be subject to other parts of the IEEE 802.11 standard and other wireless communication standards including WLAN standards including any IEEE® 802.xx standard (e.g. IEEE 802.15, IEEE 802.16, IEEE 802.19, IEEE 802.20, and IEEE 802.22), personal area network standards, wide area network standards, or cellular communication standards.

One exemplary network may be a WLAN and is described below. Alternatively, the mobile devices may receive an IP address or other address for accessing a network through other protocols and architectures, including a cellular network or a WiMax network. The network may comprise a publicly accessible network, such as the Internet, a private network, such as an intranet, or combinations thereof, and may utilize a variety of networking protocols now available or later developed including, but not limited to TCP/IP based networking protocols. The networks may include any communication method or employ any form of machine-readable media for communicating information from one device to another. The assignment of IP addresses by networks may be implemented in many environments providing WLAN access for network connectivity or in WLAN access locations or environments in which it may be expected that one or more users carrying respective mobile devices will associate with (i.e., join or connect to) and disassociate from a wireless network, AP, or WLAN as they enter and exit the WLAN access locations or environments.

Some WLAN locations or environments may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc. Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In some systems, a subscriber/user may subscribe to such a service can use wireless network access and/or Internet-access services based on such a subscription when the subscriber is in communication proximity of the WLAN with an appropriate mobile device. An external network (e.g. ESS) may include one or more WLANs or hotspots.

In accordance with the embodiments described herein, mobile devices may request network capabilities (such as the IP address assignment features) from WLANs using an Access Network Query Protocol ("ANQP"). ANQP supports information retrieval from an Advertisement Server that supports a Generic Advertisement Service ("GAS"). ANQP and GAS are defined in IEEE® 802.11u™ and also IEEE® 802.11-2012™, the entire disclosures of which are incorporated by reference. Generic Advertisement Service ("GAS") may serve as a transport mechanism, at layer-2 (see e.g. FIG. 2), for an advertisement protocol such as ANQP. The advertisement protocol may connect the mobile device to one of several interworked servers. The advertisement protocol allows the transmission of frames between a mobile device and a server in the network prior to network connectivity. For example, GAS provides support for network selection by a mobile device as well as for communication between the mobile device and other information resources in the network before the mobile device associates with a WLAN. The mobile device may be connected to a layer-2 radio service, without exchanging any authentication parameters or without having a recognized session (because no session keys are established and no internet protocol "IP" address is assigned). When in compliance with the IEEE 802.11 standard, no data traffic is allowed in this state.

Other layer-2 transport mechanisms or even authentication mechanisms may be used. For example, the Extensible Authentication Protocol ("EAP") may be used to carry the advertisement protocol. The advertisement protocol information would be encapsulated within a suitable EAP-TLV (type length value) method frame (or alternative EAP method frame) and transported by the EAP. Use of secure credentials exchanged during the EAP transactions would also provide a level of security for any information carried within the advertisement protocol. For example, if EAP-SIM (or EAP-AKA) were to be the authentication protocol, any advertisement protocol information encapsulated (i.e. securely carried) within a suitable EAP-TLV frame during the same EAP transaction may also be protected by the SIM credentials.

Access Network Query Protocol ("ANQP") is an advertisement protocol and operates as a query and response protocol used by a mobile device to discover a range of information from a server including accessible roaming partners internet protocol address type availability, and other metadata useful in the mobile device's network selection process. ANQP is capable of discovering information about hotspots or wireless networks, prior to the mobile device establishing network connectivity and associating with that network. For example, ANQP may be used to verify whether networks support the IP address assignment protocol that allows transitions between multiple networks that share a pool of IP addresses. In addition to being defined in IEEE® 802.11u, additional ANQP messages may alternatively or additionally be defined in the Wi-Fi Alliance ("WFA") Hotspot 2.0 (also referred to as Passpoint) specifications. These ANQP extensions within the WFA Hotspot 2.0 specifications may be referred to as Hotspot ("HS") 2.0 ANQP elements. Alternatively, other advertisement protocols (e.g., Registered Location Query Protocol "RLQP" as defined in IEEE® 802.11af and Hotspot Registration Protocol "HRP" as defined in Wi-Fi Alliance Hotspot 2.0) may also be used.

FIG. 1 illustrates a communication network 100. Network information may be communicated during network discovery using ANQP over the communications network 100. The communication network 100 includes a plurality of WLAN access locations 102a-c having respective APs 104a-c that provide access to respective access networks 106a-c. The APs 104a-c are further described with respect to FIG. 6. The access network A 106a provides access to an external network A 108a and the access network B 106b provides access to an external network B 108b. Unlike the access networks A 106a and B 106b that do not connect directly to the Internet 112, the access network C 110 may connect directly to a publicly accessible network like the Internet. Thus, the access network C 106c may be a public network, while the access networks A 106a and B 106b may be private networks. Any of the described networks may form part of an ESS.

In one embodiment, each of the external networks A 108a and B 108b may be a subscription service provider network ("SSPN") owned or operated by data subscription service providers, Internet subscription service providers ("SP"), media (e.g., audio/video) subscription service providers, wireless communications subscription service providers, or any combination thereof. The external networks A 108a and B 108b are connected to the Internet 112 and may, for example, provide subscription-based Internet access to mobile devices. In some implementations, roaming agreements between different subscription service providers may enable the external networks A 108a and B 108b to support roaming connections for mobile devices associated with other subscription service providers. In one embodiment, the external networks 108a-b are ESSs. Alternatively, networks 106a-c may be ESSs.

The WLAN access location 102a illustrates a mobile device 114 in wireless range of the AP 104a. The mobile device 114 is further described with respect to FIG. 5. The AP 104a connects with the access network A 106a, which may provide a direct or indirect connection to other networks, including publicly accessible network like the Internet 112. Prior to the mobile device 114 associating with the access network A 106a, mobile device 114 sends a discovery request 116 to the AP 104a. The AP 104a may respond with a discovery response 118. In alternative embodiments, the discovery request 116 may originate from the AP 104a and the discovery response 118 may be from the mobile device 114, such as with mesh, peer to peer, ad-hoc or Wi-Fi Direct networks. The discovery request 116 may include an indication whether the AP accepts a protocol (e.g. LCP) for the address assignment from an entity (e.g. IP Server in FIGS. 3-4) that allows transitions across networks (e.g. ESSs) with the same IP address. The discovery response 118 may indicate compliance with such a protocol. Accordingly, the discovery request 116 and the discovery response 118 may be referred to as address assignment communications 120. The communications (discovery request 116 and the discovery response 118) establishing network compliance with a protocol that allows transitioning with the same IP address may be made in a pre-associated state relative to the access network A 106a and may also be referred to as discovery communications. In one embodiment, the address assignment communications 120 may include an IP address from a pool of IP addresses that is assigned to the mobile device 114 and allows the mobile device 114 to transition between multiple networks using the same IP address. The transmission of the IP address may be made before or as part of network association.

The discovery communications (request 116 and response 120) may be exchanged at a media access control ("MAC") sub-layer of a data link layer of the Open Systems Interconnection ("OSI") Reference Model without needing to use operations at or above an internet protocol ("IP") layer (i.e., a network layer) and without needing to otherwise provide access to the IP layer. The layers in which the discovery communication occurs are further illustrated in FIG. 2.

Each of the APs 104a-c and the mobile device 114 may include a network adapter or network interface card that facilitates connections to a wireless medium. The network interface component may be referred to as a station ("STA"). Each of the access networks 106a-c and the external networks 108a-b may be associated with one or more ESSs and an IP Server with a pool of IP addresses may distribute IP addresses to mobile device 114, which will allow the mobile device 114 to transition between networks using the same IP address.

Figure 2:
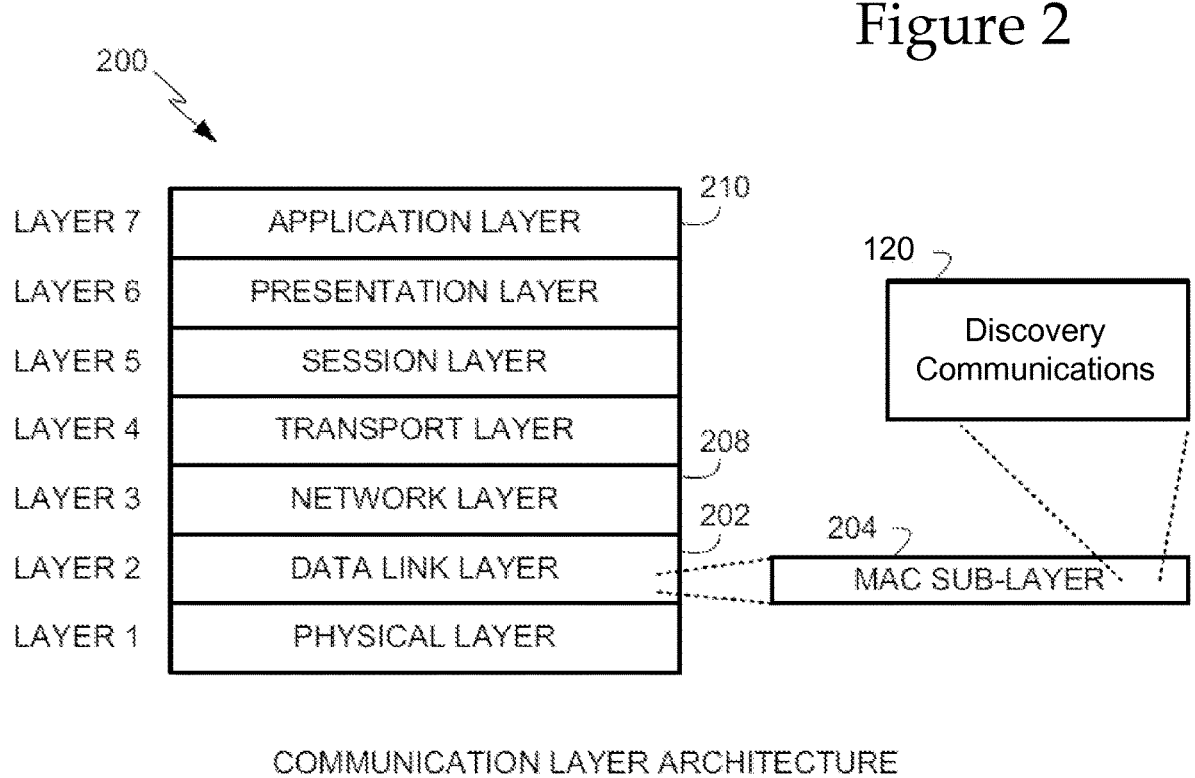
FIG. 2 illustrates a communication layer architecture.

FIG. 2 illustrates a communication layer architecture 200. The communication layer architecture 200 includes seven layers which may be implemented in accordance with the Open Systems Interconnection ("OSI") Reference Model. The communication layer architecture 200 includes a data link layer 202, which includes a media access control ("MAC") sub-layer 204. Mobile devices (e.g., the mobile device 114 of FIG. 1) may provide network information or discovery communications, such as the address assignment communications 120 (e.g. the discovery request 116 and the discovery response 118) with wireless APs (e.g., the APs 102a-c of FIG. 1) at the MAC sub-layer 204. A mobile device may access information from a memory or other hardware of the mobile device at the MAC sub-layer 204 without needing to perform operations at or above an internet protocol layer (e.g., a network layer 208) and without needing to provide access to the internet protocol layer. Mobile devices (e.g., the mobile device 114 of FIG. 1) that include mobile smart phones, PDA's, processor based devices, etc. may have relatively limited processor cycles and less available electrical power than fixed-location computing devices powered using wired (e.g. alternating current) electricity sources. Low-level resource operations at the MAC sub-layer require relatively fewer system resources than user-interface-intensive and operating system intensive operations (e.g., web-browser operations) at an application layer.

Some communications or authentication techniques that use hypertext transfer protocol ("HTTP") or other internet protocol processes may require establishing a connection between a mobile device and an AP at one or more of the layers between and including the network layer 208 and an application layer 210 of the communication layer architecture 200. In these applications, discovery communications may not require a connection or access to the network layer 208 or any layers within a protocol suite. An inclusion of a discovery communication 120 on the MAC sub-layer 204 may allow for a mobile device to communicate with a network without associating with the network.

Figure 3:
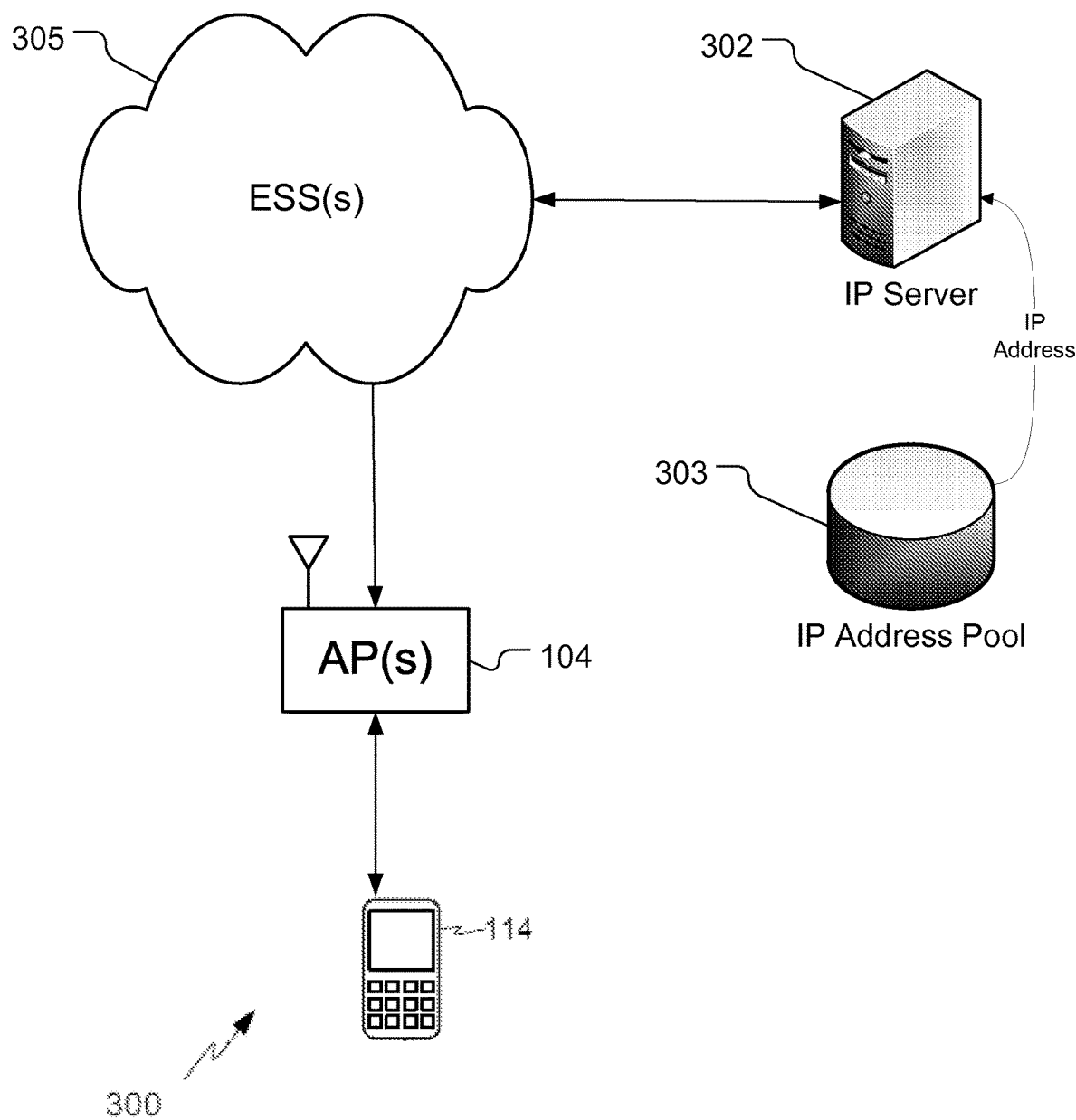
FIG. 3 illustrates an alternative communication network.
Figure 4:
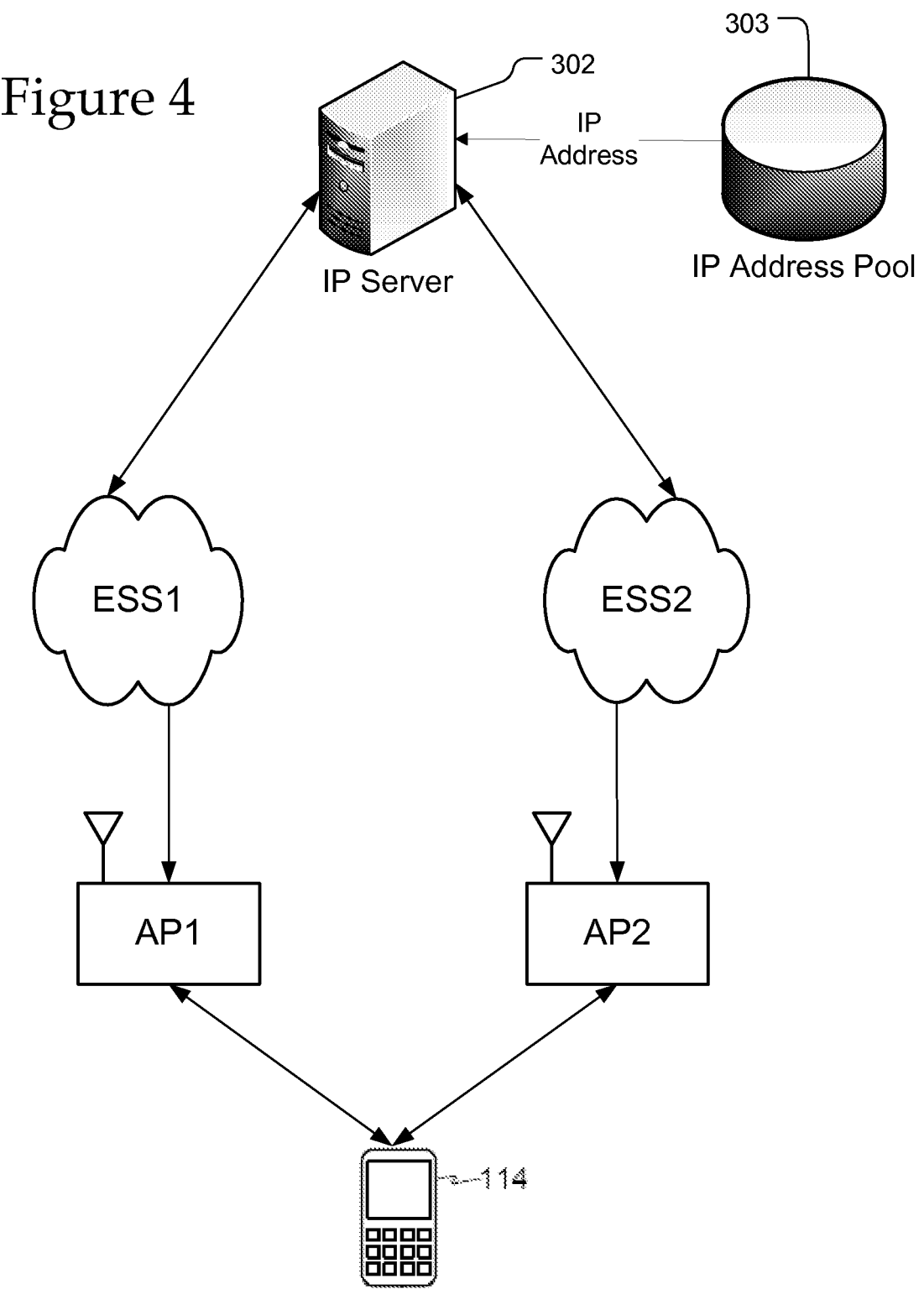
FIG. 4 illustrates another alternative communication network.

The discovery communications indicating compatibility with a protocol (e.g. LCP) with ESSs that share a pool of IP addresses may be available via APs using the MAC sub-layer. FIGS. 3-4 illustrate an IP Server that accesses the pool of IP addresses that is used to assign an IP address to the mobile device. This functionality (i.e., the compatibility with the protocol) may be indicated through a particular bit added to the Extended Capability information element ("IE") that indicates the ability to transition between ESSs with the same IP address.

FIG. 3 illustrates an alternative communication network 300. In particular, the network 300 illustrates the communication between the mobile device 114, the AP 104, and one or more ESSs 305. An IP Server 302 may be coupled with an IP address pool 303. The IP address pool 303 includes a pool of IP addresses that the IP server 302 provides to the ESSs 305. When IP addresses from the IP address pool 303 are assigned by the IP server 302 through different ESSs 305 to the mobile device 114, that device can transition between the networks using the same IP address.

The IP server 302 may be any computing device or server residing in the network that accesses IP addresses and provides them to a mobile device. The server typically has a trust relationship with all APs within the network. The IP address pool 303 may be a database that stores available IP addresses that are provided by the networks to the mobile devices accessing those networks. In one embodiment, the IP address pool 303 and IP server 302 may be a single unit or computing device. For example, the IP server 302 memory may store the IP addresses that are provided.

FIG. 4 illustrates another alternative communication network. In particular, FIG. 4 explicitly illustrates multiple ESSs (ESS1 and ESS2) that both receive IP address from the IP server 302. As discussed above, the IP server 302 accesses a pool of IP addresses 303 from which the mobile device 114 receives an IP address. As illustrated in FIG. 4, the mobile device 114 may transition between networks by moving from the range of the first AP AP1 to the range of the second AP AP2. Since AP1 is part of ESS1 and AP2 is part of ESS2, the transition between APs is also a transition between ESSs. However, since the mobile device 114 IP address is from the IP address pool 303, the IP address of the mobile device 114 does not need to change when transitioning between ESS1 and ESS2. The transition from the mobile device perspective may be seamless. The connection with the IP server for both ESSs implies that they each are compatible with a protocol, such as LCP, that allows for the utilization of the same IP address. LCP or a comparable protocol is further described below.

In alternative embodiments, there may be more ESSs that are all connected with the IP server 302. Accordingly, an IP address from the IP address pool 303 may allow the mobile device 114 to transition between any of the ESSs, while maintaining that IP address. The transition by the mobile device 114 may include leaving the range of one AP and entering the range of another AP where those APs are supported by different ESSs.

Figure 5:
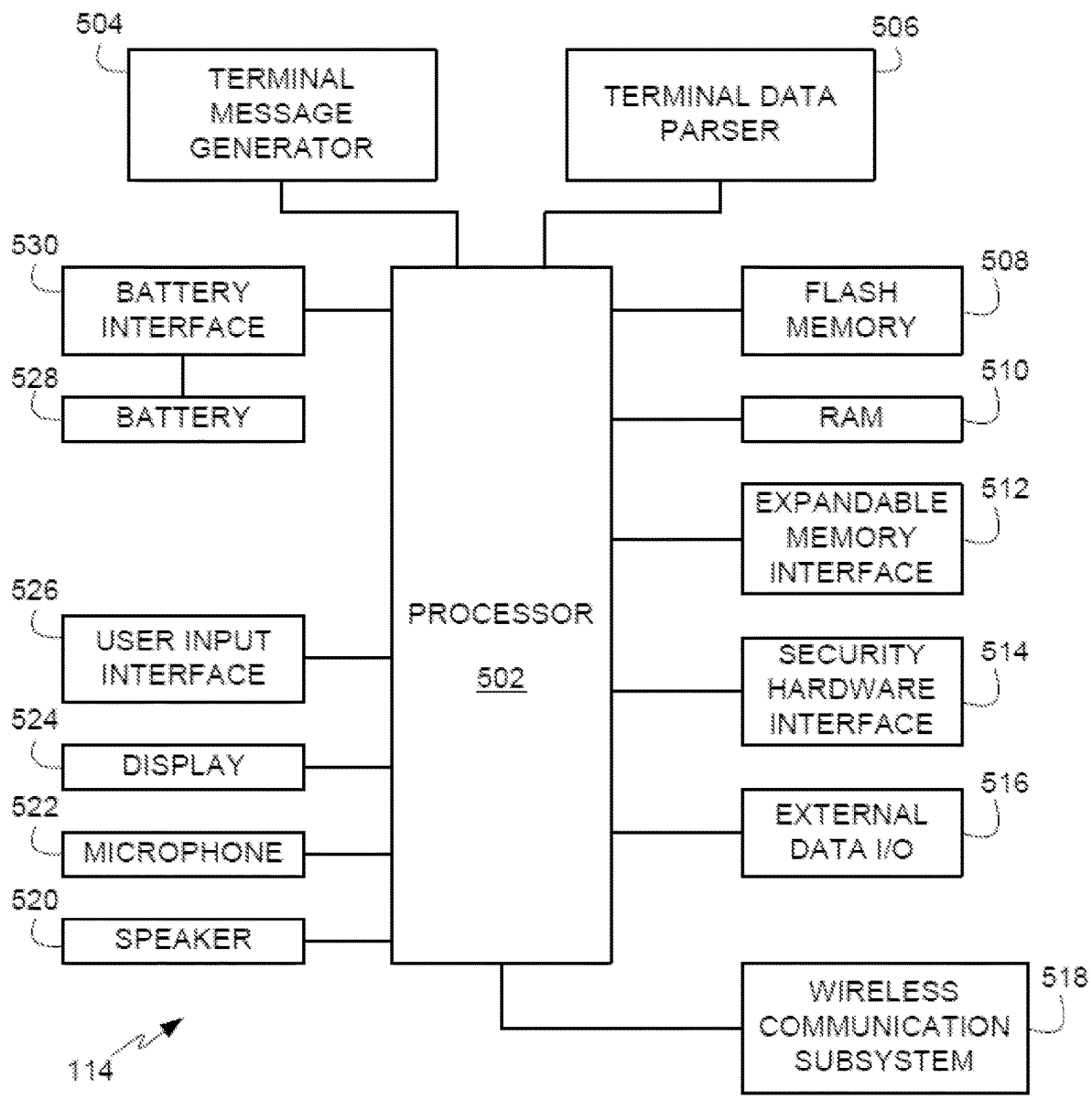
FIG. 5 illustrates a mobile device.

FIG. 5 illustrates a mobile device 114 as shown in FIGS. 1, 3, and 4. The mobile device 114 includes a processor 502 that may be used to control the overall operation of the mobile device 114. The processor 502 may be implemented using a controller, a general purpose processor, a digital signal processor, dedicated hardware, or any combination thereof. The processor 502 may include a central processing unit, a graphics processing unit, a digital signal processor or other type of processing device. The processor 502 may be a component in any one of a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may operate in conjunction with a software program, such as code generated manually (i.e., programmed).

The mobile device 114 also includes a terminal message generator 504 and a terminal data parser 506. The terminal message generator 504 may generate messages such as the discovery request 116 and discover response 118 for communicating network information such as the address assignment communications 120 from FIG. 1. The terminal data parser 506 may be used to retrieve network information from memory (e.g., random access memory 510, etc.). For example, the terminal data parser 506 may retrieve network information such as an IP address that is cached in the mobile device 114 after receipt from a WLAN (e.g., the access networks 106a-c of FIG. 1).

In the illustrated embodiment, the terminal message generator 504 and the terminal data parser 506 are shown as separate from and connected to the processor 502. In alternative embodiments, the terminal message generator 504 and the terminal data parser 506 may be implemented in the processor 502 and/or in a wireless communication subsystem (e.g., a wireless communication subsystem 518). The terminal message generator 504 and the terminal data parser 506 may be implemented using any combination of hardware, firmware, and/or software. For example, one or more integrated circuits, discrete semiconductor components, and/or passive electronic components may be used. For example, the terminal message generator 504 and the terminal data parser 506, or parts thereof, may be implemented using one or more circuits, programmable processors, application specific integrated circuits, programmable logic devices, field programmable logic devices, etc.

The terminal message generator 504 and the terminal data parser 506, or parts thereof, may be implemented using instructions, code, and/or other software and/or firmware, etc. stored on a machine accessible medium and executable by, for example, a processor (e.g., the processor 502). The terminal message generator 504 or the terminal data parser 506 may be stored on or include a tangible storage medium or memory. For example, the terminal message generator 504 or the terminal data parser 506 may be implemented in software stored on a memory that is executable by the processor 502. Alternatively, the terminal message generator 504 and/or the terminal data parser 506 may be implemented in hardware with software functions. The memory for storing software associated with the terminal message generator 504 and/or the terminal data parser 506 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 510 for the processor 502, or may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store user data. The memory is operable to store instructions executable by the processor 502.

The mobile device 114 may include a FLASH memory 508, a random access memory 510, and/or an expandable memory interface 512 coupled with the processor 502. The FLASH memory 508 may store computer readable instructions and/or data. In some embodiments, the FLASH memory 508 and/or the RAM 510 may store the network information 120 from FIG. 1 and instructions for communicating that network information 120. The processor 502 may be coupled with the memory (e.g. the FLASH memory 508, or the RAM 510) for storing software instructions executable by the processor 502. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 502 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The mobile device 114 may include a security hardware interface 514 to receive credentials (e.g. a SIM/USIM card or Near Field Communication "NFC" entity) from a wireless service provider. These credentials may be used for network discovery communications including authentication of the mobile device 114 for establishing a connection with a WLAN-supported network. The mobile device 114 may be provided with an external data I/O interface 516. The external data I/O interface 516 may be used by a user to transfer information to the mobile device 114 through a wired or wireless medium.

The mobile device 114 may include wireless communication subsystem 518 to enable wireless communications with APs (e.g., the APs 104a-c of FIG. 1). Although not shown, the mobile device 114 may also have a long-range communication subsystem to receive messages from, and send messages to, a cellular wireless network. In the illustrated examples described herein, the wireless communication subsystem 518 can be configured in accordance with the IEEE® 802.11 standard. In other example implementations, the wireless communication subsystem 518 may be implemented using a BLUETOOTH® radio, a ZIGBEE® device, a wireless USB device, an ultra-wideband radio, a Near Field Communications ("NFC") device, or a Radio Frequency Identifier ("RFID") device.

The mobile device 114 may include a user interface for communicating with the mobile device. The user interface may be separate component or it may include a speaker 520, a microphone 522, a display 524, and a user input interface 526. The display 524 may be a liquid crystal display, an organic light emitting diode, a flat panel display, a solid state display, a cathode ray tube, a projector, or other now known or later developed display device for outputting determined information. The user input interface 526 may include alphanumeric keyboard and/or telephone-type keypad, a multi-direction actuator or roller wheel with dynamic button pressing capability, a touch panel, etc. The network discovery information that is communicated with a network prior to connection may be communicated with or without each of the user interfaces described herein. The speaker, 520, the microphone 522, the display 524, the user input interface 526, and/or any combination thereof may be omitted in alternative embodiments. In one embodiment, the mobile device 114 is a battery-powered device and includes a battery 528 and a battery interface 530.

Figure 6:
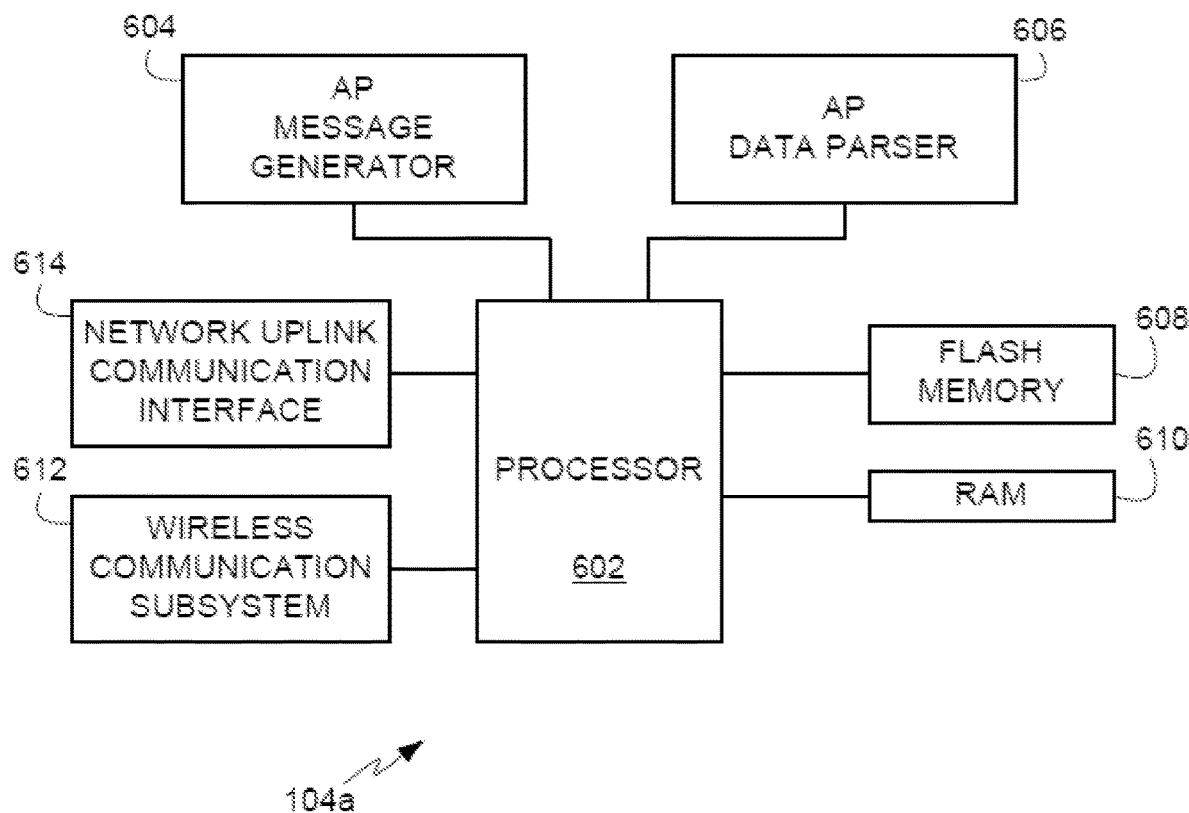
FIG. 6 illustrates an access point ("AP")

FIG. 6 illustrates an AP 104a. The AP shown in FIG. 6 is AP 104a, but may also be illustrative of other APs (e.g. APs 104b, 104c). AP 104a includes a processor 602 to perform operations of the AP 104a. The processor 602 may be similar to the processor 502 described above.

The AP 104a includes an AP message generator 604 to generate network information communications and an AP data parser 606 for retrieving network information communications from the mobile device 114 and/or the external network A 108a as illustrated in FIG. 1. The AP message generator 604 may be similar to the terminal message generator 504 of FIG. 5, and the AP data parser 606 may be similar to the terminal data parser 506 of FIG. 5. As with the terminal message generator 504 and the terminal data parser 506 of FIG. 5, the AP message generator 604 and the AP data parser 606 may be implemented in software stored on a memory that is executable by the processor 602 or may be implemented in hardware with software functions executed by the processor 602. Alternatively, the AP message generator 604 and the AP data parser 606 may be implemented in a wireless communication subsystem (e.g., a wireless communication subsystem 612) using any combination of hardware, firmware, and/or software including instructions stored on a tangible computer readable medium and/or a non-transitory computer readable medium.

The AP 104a may also include a FLASH memory 608 and a RAM 610, both of which are coupled to the processor 602. The FLASH memory 608 and/or the random access memory ("RAM") 610 may be configured to store network information (e.g., network information 120 including discovery communications from FIG. 1). The RAM 610 may also be used to generate messages for communication with the mobile device 114 and/or to the external network A 108a. The RAM 610 may also store received messages communicated by the mobile device 114 and/or the external network A 108a.

To communicate with mobile devices such as the mobile device 114, the AP 104a may include a wireless communication subsystem 612, which may be similar to the wireless communication subsystem 518 of the mobile device 114 illustrated in FIG. 5. To communicate with a WLAN-supported network or external network (e.g., the networks 106a-c, 108a, and 108b of FIG. 1), the AP 104a may include a network uplink communication interface 614.

Figure 7:
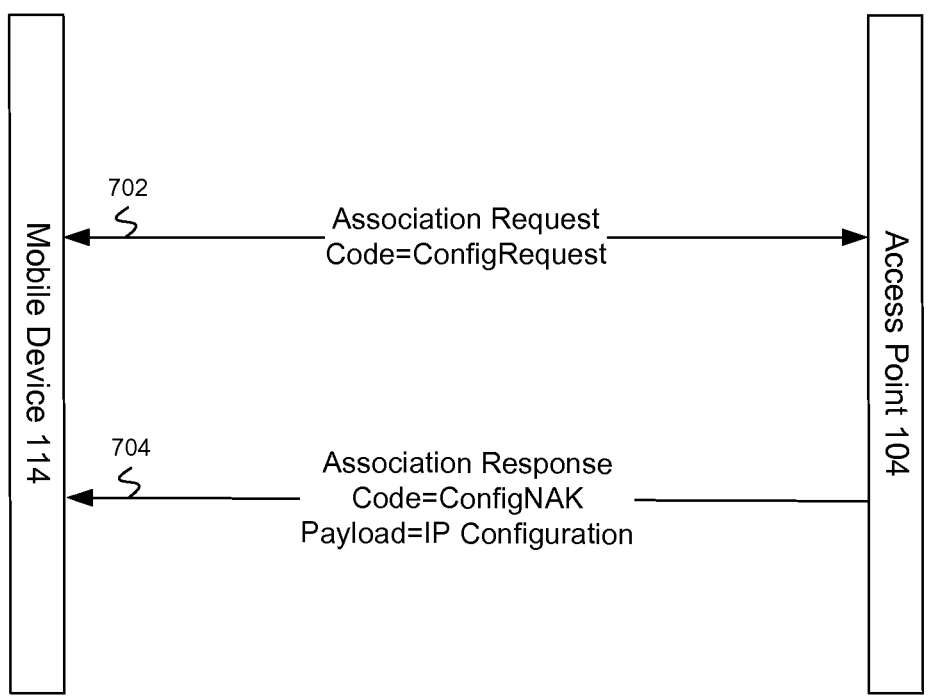
FIG. 7 illustrates association communications.

FIG. 7 illustrates association communications in an exemplary message flow for requesting and receiving an IP address. The IP address may be from the IP address pool 303. An association request 702 may be sent from the mobile device 114 to the AP. The request may include a configuration request. The response message 704 from the AP to the mobile device 114 may include a configuration code "ConfigNAK" and a payload that includes the IP Configuration.

In one embodiment, the communications may be according to the LCP protocol or another similar protocol that is point-to-point. The format for the request/response may take the form of either a vendor specific Internet Protocol Control Protocol ("IPCP") configuration option or a vendor-specific request. The association request 702 may include the following body:

TABLE 1

Association Response frame body

| Order | Information | Notes |
|---|---|---|
| <ANA> | LCP IP Address Assignment Element | The LCP IP Address Assignment element is included when dot11LCPIPAddresssActivated. |

The association request 702 may include the following body:

TABLE 2

Association Response frame body

| Order | Information | Notes |
|---|---|---|
| <ANA> | LCP IP Address Assignment Element | The LCP IP Address Assignment element is included when dot11LCPIPAddresssActivated is true and an LCP IP Address Assignment element was received in the Association Request. |

ANA refers to the IEEE 802.11 Assigned Numbers Authority and may be an integer value assigned when these tables are added to the IEEE 802.11 standard.

An example of an LCP IP Address Assignment element or sub-element may be illustrated in Table 3:

TABLE 3

| | Element ID | Length | Protocol | Identifier | Code | LCP Payload |
|---|---|---|---|---|---|---|
| Octets: | 1 | 1 | 2 | 1 | 1 | 31 or 53 |

Table 3 illustrates one embodiment of an element for address assignment according to LCP or a similar protocol. The data format of the element may be based on vendor-specific commands for the LCP protocol. The Element ID may be defined either by IEEE 802.11 or by IEEE 802.11ai. The length of the element may be fixed, such as at 37 or 59 octets. In alternative embodiments, the length of the LCP Payload may be variable, in which case an additional LCP Payload Length field would also be present. The protocol may be based on LCP and may be expressed as 0xC021. An identifier may uniquely identify the request instance from the mobile device. The code may identify the type of request/response. For example, the codes may include Configure-Request=1; Configure-Ack=2; Configure Nak=3; Configure-Reject=4; Configure-Error=5; and Configure-Unknown=6. Configure-Request may be the request that the client makes to the address assignment server for an IP address. Configure-Ack may be an acknowledgement response from the address assignment server that every value from the client has been accepted. Configure-Nak may be a non-acknowledgement response from the address assignment server that every value from the client has been recognized but not all of them have been accepted. Configure-Reject may be a response from the address assignment server that some values from the client have not been recognized or some of them have not been accepted. Configure-Error may be a response from the address assignment server that an error has occurred. Configure-Unknown may be a response from the address assignment server that an address has not been assigned for an unknown reason.

The format of the LCP Payload field is either 31 or 53 octets in length may be illustrated in Table 4 for an IPv4 address and in Table 5 for an IPv6 address:

TABLE 4

| | Magic Number | OUI | Type | IP Address | Subnet mask | Default gateway | Primary DNS | Secondary DNS |
|---|---|---|---|---|---|---|---|---|
| Octets: | 1 | 3 | 1 | 4 | 4 | 4 | 4 | 4 |

TABLE 5

| | Magic Number | OUI | Type | IP Address | Primary DNS | Secondary DNS |
|---|---|---|---|---|---|---|
| Octets: | 1 | 3 | 1 | 16 | 16 | 16 |

The Magic Number may be set to 0. The OUI is the Organization Unit Identifier that indicates IEEE 802.11 and may be set to 00:0F:AC. The OUI field may be provided to maintain consistency with the existing LCP protocol. The Type field indicates whether the request is for an IPv4, or an IPv6 address, or both. On the request the type field may correspond to the following values: 0=reserved; 1=STA supports IPv4 only; 2=STA supports IPv6 only; and 3=STA supports both IPv4 and IPv6. The Type field in the response is set to either 1 or 2 to indicate the address provided is an IPv4 or IPv6 address, respectively. The IP address field may always be present and indicates the IPv4 or IPv6 IP address when not set to 0. The Subnet mask field may only be present when the Type field equals 1 and is the subnet mask for the IP address as expressed as a bit field. The Default Gateway field may only be present when the Type field equals 1 and indicates the default gateway IP address when not set to 0. The Primary DNS field may always be present and is the IP address of the primary DNS server when not set to 0. The Secondary DNS field may always be present and is the IP address of the secondary DNS server. If there is no secondary DNS, all octets are set to 0.

In one embodiment, digital signatures derived from a security association established prior to association may be used to maintain either confidentiality or message integrity of the LCP IP Address Assignment element. For example, a MIC field defined in a similar manner to the MIC field may be used to confirm authenticity of the LCP IP Address Assignment element during the association.

The procedure for associating a mobile device may include the LCP IP address assignment element in the association request 702 and/or response 704. It may set the code field in the LCP IP address assignment element to 1 to indicate a configure-request. If the associating mobile device has an IP configuration cached for the ESS, it may include the IP configuration in the LCP payload field. It sets the Type value in the LCP payload field to 1 if the configuration is IPv4, or 2 if the IP configuration is IPv6. If it does not have a cached configuration for the network, it sets the Type field in the LCP Payload field to 1 if it supports IPv4 only, 2 if it supports IPv6 only, or 3 if it supports IPv4 or IPv6. It sets the remaining LCP payload fields to its cached IP configuration.

When the associating mobile device receives the association response 704 containing the LCP IP address assignment element, it examines the code field and performs the following: 1) if the code field is set to configuration-Ack, the mobile device sets its IP address configuration that it provided in the associate request 702; 2) if the code field is set to configuration-Nak, the mobile device sets its IP address configuration that was provided in the association response 704; 3) if the code field is set to configuration-Reject, the mobile device uses a higher layer mechanism such as DHCP to obtain an IP address configuration after it completes the association; 4) if the code field is set to configuration-Ack, but the mobile device did not provide an IP address configuration in the association request 702, the mobile device uses a higher layer mechanism such as DHCP to obtain an IP address configuration after it completes the association.

The procedure for an AP that receives an association request 702 that includes the LCP IP address assignment element may generate response 704. If the code field in the Association Request 702 is not set to 1, the AP may respond with the code field set to configure-Reject. The IP address, Subnet MASK, Default Gateway, Primary DNS and Secondary DNS fields are all set to 0. Conversely, if the code field in the Association Request 702 is set to 1 and the mobile device has supplied a valid IP address configuration for the network, the AP will check the validity of the IP address configuration against its configured IP address pool and respond with an LCP IP address assignment element with the code set to configure-Ack. The LCP Payload fields with the exception of the Magic Number and OUI fields may be all set to 0. Finally, if the code field in the Association Request 702 is set to 1 and the mobile device has supplied either an invalid IP address configuration or IP address, Subnet MASK, Default Gateway, Primary DNS, and Secondary DNS fields are set to 0, the AP shall assign the mobile device an IP address configuration from its IP address configuration pool. The AP shall respond with an LCP IP address assignment element with the code set to configure-Nak, and with the LCP Payload fields set to the IP configuration for the mobile device. Any valid IP address configuration may contain non-zero values for the IP address, subnet mask, Default Gateway address, and Primary DNS fields corresponding to the Type field value. If there is no assigned Secondary DNS, the Secondary DNS may be set to 0.

The capability described above assigns the IP address to the mobile device (e.g. a STA) such that the mobile device can maintain the IP address when transitioning between networks (e.g. ESSs). This capability may be advertised with pre-association/discovery communications. In one embodiment, ANQP may be utilized to advertise this capability. The advertisement allows a mobile device to determine if a network (e.g. a currently connected network and/or a network to be transitioned to) has this capability. In particular, the mobile device and/or AP may advertise if it includes this capability. The advertisement may be through a new bit that is defined within the IEEE 802.11 extended capabilities element. Alternatively, a new ANQP-element may be defined advertising this capability. Finally, a new bit may be added to the association request frame indicating this capability. As described, this capability may be referred to as an LCP capability, LCP compatibility or LCP support, but it should be understood that alternative protocols other than LCP may also be utilized.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method implemented by an access point, comprising:
   assigning an internet protocol ("IP") address to a mobile device that is available for use by the mobile device in a wireless network;
   prior to sending the IP address to the mobile device, receiving a request from the mobile device for an association with the access point, the request comprising a first IP Address Assignment element comprising a first identifier subfield, a first type subfield, and a first subnet mask subfield, the first identifier subfield indicating that the request is for an IP address, the first type subfield indicating whether an IPv4 or IPv6 address type is requested, the first type subfield being 1 octet in length, the first subnet mask subfield being left empty in the first IP Address Assignment element; and
   sending a response comprising a second IP Address Assignment element from the access point to the mobile device, the second IP Address Assignment element comprising a second identifier subfield, a second type subfield, the IP address assigned to the mobile device, and a Domain Name System (DNS) field,
   wherein, when the request is for IPv4, the IP address is an IPv4 address included in a payload subfield of the second IP Address Assignment element, the payload subfield being 4 octets in length, the second IP Address Assignment element also including a subnet mask subfield, the subnet mask subfield comprising a subnet mask for the IP address assigned to the mobile device,
   wherein, when the request is for IPv6, the IP address is an IPv6 address included in the payload subfield of the second IP Address Assignment element, the payload subfield being 16 octets in length,
   wherein the request is an association request and the response is an association response, and
   wherein the response and the request comprise data link layer messages in accordance with an Institute of Electrical and Electronics Engineers (IEEE) 802.11 standard.

2. The method of claim 1, wherein the IP address is assigned by a higher layer entity.

3. The method of claim 1, wherein a subfield of the second IP Address Assignment element comprises a default gateway.

4. The method of claim 1, further comprising receiving an indication from the mobile device of an ability to transition between a plurality of wireless networks using the IP address.

5. The method of claim 1, wherein the mobile device receives the IP address from the access point in response to sending a discovery request, wherein the mobile device does not perform operations at or above a network layer of the Open Systems Interconnection ("OSI") Reference Model during an association state in which the discovery and IP requests are exchanged between the mobile device and the access point, and wherein a security association between the mobile device and the access point is established prior to the association state.

6. The method of claim 1, wherein the IP address is available through both a first Extended Service Set (ESS) wireless network and a second ESS wireless network, and wherein the access point employs an Access Network Query Protocol ("ANQP") to notify the mobile device of a capability prior to assigning the IP address to the mobile device, the capability indicating an ability of transitioning between the first and second ESS wireless networks using the IP address assigned to the mobile device.

7. The method of claim 6, wherein the IP address is provided at a media access control ("MAC") sub-layer by an IP server that accesses the access point.

8. The method of claim 1, wherein sending the IP address is based on a Link Control Protocol ("LCP"), wherein the LCP is used to allow the mobile device to communicate with a wireless network without associating with the wireless network by adding a bit to an Extended Capability information element ("IE"), wherein the bit added to the Extended Capability IE indicates that the mobile device is able to transition between different wireless networks with the IP address sent to the mobile device.

9. A method comprising:
requesting, by a mobile device, an internet protocol ("IP") address that is available for use by the mobile device in a wireless network;
sending a request for an association with an access point prior to receiving a second IP Address Assignment element, wherein the request comprises a first IP Address Assignment element comprising a first identifier subfield, a first type subfield, and a first subnet mask subfield, the first identifier subfield indicating that the request is for an IP address, the first type subfield indicating whether an IPv4 or IPv6 address type is requested, the first type subfield being 1 octet in length, the first subnet mask subfield being left empty in the first IP Address Assignment element; and
receiving a response comprising the second IP Address Assignment element from the access point, the second IP Address Assignment element comprising a second identifier subfield, a second type subfield, the IP address assigned to the mobile device, and a Domain Name System (DNS) field,
wherein, when the request is for IPv4, the IP address is an IPv4 address included in a payload subfield of the second IP Address Assignment element, the payload subfield being 4 octets in length the second IP Address Assignment element also including a subnet mask subfield, the subnet mask subfield comprising a subnet mask for the IP address assigned to the mobile device,
wherein, when the request is for IPv6, the IP address is an IPv6 address included in the payload subfield of the second IP Address Assignment element, the payload subfield being 16 octets in length,
wherein the request is an association request and the response is an association response, and
wherein the response and the request comprise data link layer messages in accordance with an Institute of Electrical and Electronics Engineers (IEEE) 802.11 standard.

10. The method of claim 9, wherein the IP address is assigned by a higher layer entity.

11. The method of claim 9, wherein a subfield of the second IP Address Assignment element comprises a default gateway.

12. The method of claim 9, wherein the IP address is received by the mobile device.

13. The method of claim 9, wherein the IP address is available through both a first Extended Service Set (ESS) network and a second ESS network, and wherein the mobile device receives a notification from the access point of a capability prior to requesting the association with the access point, the capability indicating an ability of transitioning between the first and second ESS wireless networks using the IP address.

14. The method of claim 13, wherein the IP address is provided at a media access control ("MAC") sub-layer by an IP server that accesses the access point.

15. A method for assigning addresses implemented by a network entity, comprising:
assigning an internet protocol ("IP") address to a mobile device that is available for use by the mobile device in a wireless network;
prior to sending the IP address to the mobile device, receiving a request from the mobile device for an association with the network entity, the request comprising a first IP Address Assignment element comprising a first identifier subfield, a first type subfield, and a first subnet mask subfield, the first identifier subfield indicating that the request is for an IP address, the first type subfield indicating whether an IPv4 or IPv6 address type is requested, the first type subfield being 1 octet in length, the first subnet mask subfield being left empty in the first IP Address Assignment element;
sending a response comprising a second IP Address Assignment element from the network entity to the mobile device, the second IP Address Assignment element comprising a second identifier subfield, a second type subfield, the IP address assigned to the mobile device, and a Domain Name System (DNS) field,
wherein, when the request is for IPv4, the IP address is an IPv4 address included in a payload subfield of the second IP Address Assignment element, the payload subfield being 4 octets in length, the second IP Address Assignment element also including a subnet mask subfield, the subnet mask subfield comprising a subnet mask for the IP address assigned to the mobile device,
wherein, when the request is for IPv6, the IP address is an IPv6 address included in the payload subfield of the second IP Address Assignment element, the payload subfield being 16 octets in length,
wherein the request is an association request and the response is an association response, and
wherein the response and the request comprise data link layer messages in accordance with an Institute of Electrical and Electronics Engineers (IEEE) 802.11 standard.

16. The method of claim 15, wherein the IP address is assigned to the mobile device and the mobile device transitions from a first wireless local area network (WLAN) to a second WLAN while maintaining the assigned IP address, wherein the IP address is exchanged between the mobile device and the network entity at a sublayer of a data link layer.

* * * * *